(12) United States Patent
Endo

(10) Patent No.: US 11,816,372 B2
(45) Date of Patent: Nov. 14, 2023

(54) CONTROL SYSTEM, SERVER SYSTEM, CONTROL METHOD, AND STORAGE MEDIUM

(71) Applicant: CANON KABUSHIKI KAISHA, Tokyo (JP)

(72) Inventor: Shinya Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/844,784

(22) Filed: Jun. 21, 2022

(65) Prior Publication Data

US 2022/0413782 A1    Dec. 29, 2022

(30) Foreign Application Priority Data

Jun. 24, 2021   (JP) ................. 2021-104838

(51) Int. Cl.
*G06F 3/12*         (2006.01)
(52) U.S. Cl.
CPC .......... *G06F 3/1247* (2013.01); *G06F 3/1206* (2013.01); *G06F 3/1231* (2013.01); *G06F 3/1232* (2013.01)
(58) Field of Classification Search
CPC .... G06F 3/1247; G06F 3/1206; G06F 3/1231; G06F 3/1232
See application file for complete search history.

(56) References Cited

U.S. PATENT DOCUMENTS

| 8,477,350 | B2 | 7/2013 | Jazayeri et al. |
| 8,867,069 | B2 | 10/2014 | Jazayeri et al. |
| 8,867,070 | B2 | 10/2014 | Jazayeri et al. |
| 9,032,498 | B1* | 5/2015 | Ben Ayed ............... G06F 21/35 |
| | | | 726/9 |
| 9,119,076 | B1* | 8/2015 | Gubbi ................ H04L 63/0853 |
| 2015/0092233 | A1* | 4/2015 | Park .................... H04N 1/00244 |
| | | | 358/1.15 |
| 2019/0372970 | A1* | 12/2019 | Yan ........................ G10L 17/04 |
| 2020/0112612 | A1* | 4/2020 | Chandaria ............. H04L 67/141 |
| 2020/0177407 | A1* | 6/2020 | Nakamura .............. G10L 15/22 |
| 2021/0216251 | A1* | 7/2021 | Suzuki .................... H04L 67/51 |

FOREIGN PATENT DOCUMENTS

JP        2015-092394 A    5/2015

* cited by examiner

*Primary Examiner* — John R Wallace
(74) *Attorney, Agent, or Firm* — Venable LLP

(57) ABSTRACT

A control system includes a control target device communicable with an information terminal and a server system. The server system includes an issue unit issuing a registration code in accordance with an input format of the information terminal in response to an issue request of a registration code from the control target device and a reply unit replying the registration code to the control target device. The control target device presents the replied registration code. If the presented registration code is inputted to the information terminal, information including the inputted registration code and an ID of the information terminal is transmitted to the server system. If the registration code transmitted from the information terminal and an input format thereof coincide with the registration code issued from the issue unit and an input format thereof, the server system performs registration processing for associating the information terminal with the control target device.

14 Claims, 21 Drawing Sheets

| REGISTRATION CODE | INPUT FORMAT | PRINTING DEVICE ID |
|---|---|---|
| 1KGC658 | text | P00001 |
| december | voice | P00001 |
| B1RT87Y | text | P00200 |
| computer | voice | P00200 |
| OPCT4NM | text | P10914 |
| I have a pen | voice | P10914 |

| REGISTRATION CODE | INPUT FORMAT | PRINTING DEVICE ID |
|---|---|---|
| 1KGC658 | text | P00001 |
| october | voice | P00001 |
| 1258,4589,78523 | pattern | P00001 |
| B1RT87Y | text | P00200 |
| computer | voice | P00200 |
| OPCT4NM | text | P10914 |
| I have a pen | voice | P10914 |

FIG.19

CONTROL SYSTEM, SERVER SYSTEM, CONTROL METHOD, AND STORAGE MEDIUM

BACKGROUND OF THE INVENTION

Field of the Invention

The present disclosure relates to a control system, a server, a control method, and a storage medium that are capable of controlling a device from an information terminal through the server.

Description of the Related Art

Japanese Patent Laid-Open No. 2015-92394 discloses a printing control system that allows a printing device to be used from an information terminal by associating the printing device with the terminal by assigning a registration code for specifying an individual printing device from the printing device and inputting the registration code from the terminal to the printing control system.

On the other hand, recent years, an information terminal that supports multiple types of input formats, such as voice input, in addition to keyboard input has been used.

SUMMARY OF THE INVENTION

Along with the above-described diversification of input formats of an information terminal in recent years, there has been demanded also for a printing control system to allow for input of a registration code for associating a printing device with an information terminal in multiple input formats including not only keyboard input but also voice input and the like.

An object of the present disclosure is to provide a technique that makes it possible to efficiently associate a printing device with an information terminal.

The present disclosure is a control system, including: a control target device communicable with an information terminal; and a server system, the server system including an issue unit that issues a registration code in accordance with an input format of the information terminal in response to an issue request of a registration code and a reply unit that replies the registration code to the control target device, the control target device including an issue request unit that generates the issue request transmitted to the server system and a presenting unit that presents the registration code replied from the reply unit to a user. Here, in a case where the registration code presented by the control target device is inputted to the information terminal, information including the inputted registration code and an ID of the information terminal is transmitted to the server system, and in a case where the registration code transmitted from the information terminal and an input format of the registration code coincide with the registration code issued by the issue unit and an input format of the registration code, the server system performs registration processing for associating the control target device with the information terminal specified by the ID.

According to the present disclosure, it is possible to efficiently associate a printing device with an information terminal.

Further features of the present invention will become apparent from the following description of exemplary embodiments with reference to the attached drawings.

BRIEF DESCRIPTION OF THE DRAWINGS

FIG. 19 is a diagram illustrating a configuration example of a registration code DB and a pattern code example according to the fourth embodiment;

DESCRIPTION OF THE EMBODIMENTS

Hereinafter, embodiments of the present invention are described in detail with reference to the accompanying drawings. The following embodiments are not intended to limit the present invention according to the scope of claims, and not all the combinations of characteristics described in the present embodiments are necessarily required for means for solving the present invention. In the following embodiments, as a control system according to the present invention, mainly, a printing control system that controls a printing device having a printing function is described as an example.

First Embodiment

Figure 1:
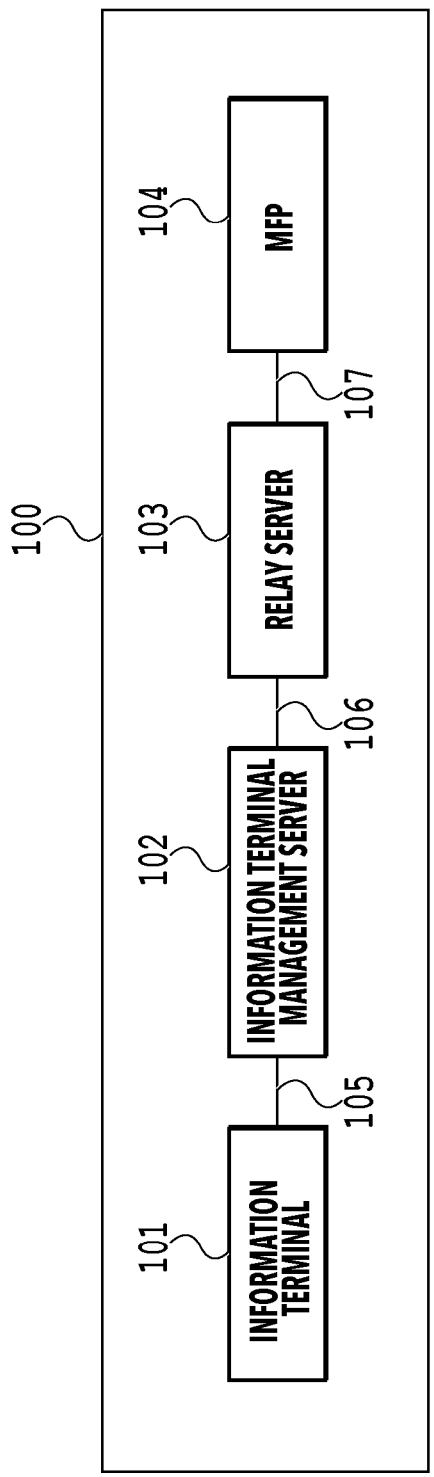
FIG. 1 is a diagram illustrating a configuration example of a printing control system according to an embodiment.

FIG. 1 is a diagram illustrating a configuration example of a printing control system 100 according to the present embodiment. The printing control system 100 illustrated in FIG. 1 includes an information terminal 101, an information terminal management server 102, a relay server 103, and a printing device (MFP) 104. In the present embodiment, the printing device 104 is described as an example of a control target device. A printing device is described while using as an example a multi function printer (MFP) having functions and the like of a copier, a scanner, a fax, and so on in addition to the printing function. The MFP 104 holds a printing device ID (identification information) that identifies itself in a storage region and is communicable with the relay server 103 through a network 107.

The relay server 103 includes a database for registration codes (registration code DB). The registration code DB is a database that registers and manages a one-time registration code of each input format used in processing described later and the MFP 104 in association with each other. The relay server 103 has a function as an issue unit that issues a one-time registration code associated with a printing device ID (ID of the MFP 104) once receiving a request of registering the MFP 104 and the information terminal 101 in association with each other (an issue request of the registration code). The relay server 103 saves the printing device ID and the issued one-time registration code into the registration code DB. As the registration code in the present embodiment, different codes depending on each input format of the information terminal 101 are defined for the same printing device ID. The registration code DB and the registration code are described later in more detail. The relay server 103 performs processing corresponding to an instruction command inputted by a user to the information terminal 101 and performs device control to cause a device (a device such as the MFP 104) as a control target device associated with the information terminal 101 to execute predetermined processing corresponding to the instruction command.

An application that is able to control the device as the control target device is installed in the information terminal 101. The user is able to make an instruction for the device control by inputting voice and characters from the information terminal 101 by way of the application. That is, the user is able to control various devices from the information terminal 101 through the network by making a predetermined instruction by input to the information terminal 101 such as voice input with vocalization and character input by a keyboard or the like. In a case where voice input is performed, the information terminal 101 phonetically recognizes the voice of the user inputted to a microphone and is able to transmit the voice data to the information terminal management server 102 through a network 105. The information terminal 101 is also able to output the voice data received through the network 105 by a speaker. As the information terminal 101, various devices are applicable. For example, a mobile terminal and the like such as a smartphone and a wearable speaker are applicable.

The information terminal management server 102 constructs a system that provides a variety of services by linking the information terminal 101 with a variety of other information equipment and devices. Once receiving a command from the user, the information terminal 101 transmits the instruction information to the information terminal management server 102. The information terminal management server 102 includes a server management DB. In the server management DB, call names (described later) of relay servers and the like respectively corresponding to the MFP 104 and other devices and URLs of the relay servers are saved in association with each other. Based on a call name included in the instruction information transmitted from the information terminal 101 and the information (the URL) saved in the server management DB, the information terminal management server 102 specifies the relay server 103 as a transfer destination of a command included in instruction information. The information terminal management server 102 transfers the command based on the instruction information transmitted from the information terminal 101 and information representing an input format of input data of the information terminal 101 to the relay server 103 as the target through a network 106. Thus, the relay server 103 provides a service in accordance with the inputted command and the input format of the input data.

The instruction information transmitted from the information terminal 101 to the information terminal management server 102 may be voice data. In a case where the instruction data is voice data, the information terminal management server 102 transcribes the voice data as the instruction data into text and then transfers a command based on the instruction data transcribed into text to the relay server 103.

Thereafter, once receiving response data to the command of the user from the relay server 103, the information terminal management server 102 transfers the received response data to the information terminal 101. The information terminal 101 displays a response content represented by the received response data on a screen. It is also possible to output the response data with voice. As described above, the information terminal management server 102 has an intermediation function between the relay server 103 and the information terminal 101, and the server system of the present embodiment is formed of the information terminal management server 102 and one or more relay servers 103 communicably connected to the information terminal management server 102. In the present example, the relay server 103 and the information terminal management server 102 are provided as different servers; however, a single server may have the functions of the relay server 103 and the information terminal management server 102. The relay server 103 may include multiple servers. That is, the function of the relay server 103 may be executed by multiple servers operating cooperatively. Likewise, the information terminal management server 102 may include multiple servers. In the present disclosure, a configuration including a single server or multiple servers is called a server system.

Figure 2:
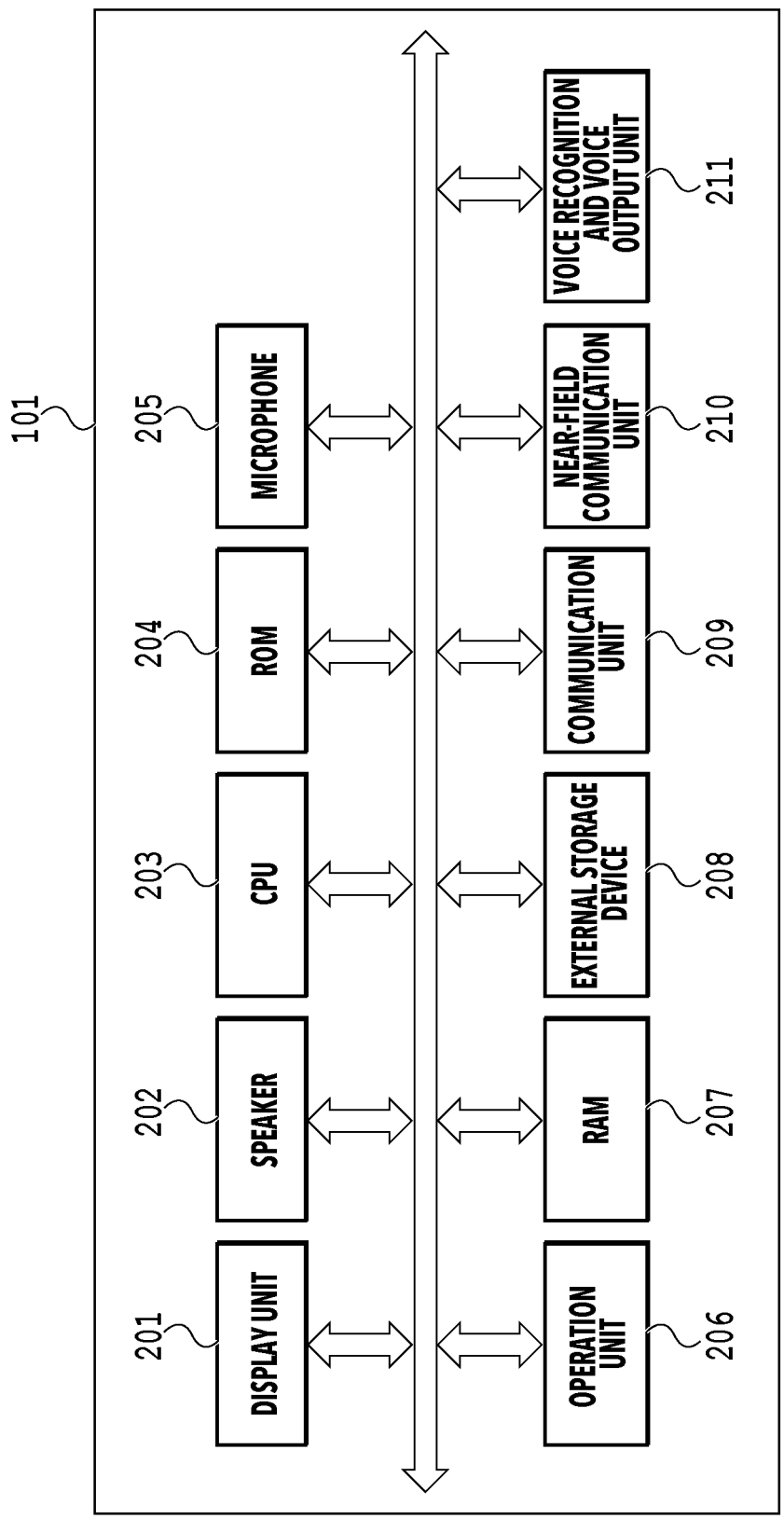
FIG. 2 is a diagram illustrating a configuration example of hardware of an information terminal according to the embodiment.

FIG. 2 is a diagram illustrating a hardware configuration example of the above-described information terminal 101. The information terminal 101 includes a display unit 201, a speaker 202, a central processing unit (CPU) 203, a read only memory (ROM) 204, and a microphone 205. The information terminal 101 additionally includes an operation unit 206, a random access memory (RAM) 207, an external storage device 208, a communication unit 209, and a near-field communication unit 210. The constituents illustrated in FIG. 2 are, for example, communicably connected to each other by using an internal bus. A function of the information terminal 101 according to the present embodiment is, for example, implemented by the CPU 203 that loads a program stored in the ROM 204 to the RAM 207 and executes the program.

The display unit 201 is formed of a liquid crystal display (LCD), for example, and displays various pieces of information. The speaker 202 outputs voice based on voice data. The CPU 203 is formed on a system control substrate (not illustrated), for example, and controls overall the information terminal 101. The ROM 204 stores fixed data such as a control program to be executed by the CPU 203, a data table, and an embedded operating system (OS) program. In the present embodiment, each control program stored in the ROM 204 is a target of the software execution control by the embedded OS stored in the ROM 204. The software execution control is, for example, scheduling, task switching, and interruption processing. The microphone 205 functions as a voice input unit that inputs, as the voice data, voice around the information terminal 101 that is, for example, voice of the user. The operation unit 206 is a unit that allows the user to make an instruction and operate and, for example, includes a keyboard for performing character input (text input), various switches and buttons, and the like. The operation unit 206 may be integral with a display unit like a touch panel. The operation unit 206 and the microphone 205 form an input unit of the information terminal 101.

The RAM 207 is, for example, formed of a static RAM (SRAM) that requires a backup power supply. In the RAM 207, since data is held by a not-illustrated primary cell for data backup, data such as a program control variable can be held with no volatilization. A memory area that stores setting information, management data, and the like of the information terminal 101 is also provided in the RAM 207. Additionally, the RAM 207 is also used as a main memory and a working memory of the CPU 203. The external storage device 208 is a non-volatile storage region and, for example, stores an application program that provides various functions.

The communication unit 209 includes a circuit and an antenna for establishing the communication in accordance with a predetermined wireless communication method. For example, the communication unit 209 can be wirelessly connected to an access point. The communication unit 209 is also operatable as an access point temporarily. The wireless communication used in the present embodiment may have a capability of operating in accordance with a wireless communication method of a wireless LAN complying with IEEE 802.11 series of standards or may have a capability of operating in accordance with another wireless communication method. The near-field communication unit 210 establishes the near-field communication with another device that exists within a range of certain near-field from the information terminal 101. The near-field communication unit 210 establishes the communication by a wireless communication method different from the method by the communication unit 209. In the present embodiment, the near-field communication unit 210 operates in accordance with the Bluetooth (registered trademark) standards; however, the near-field communication may be established based on other standards.

A voice recognition and voice output unit 211 phonetically recognizes the voice inputted through the microphone 205 and generates voice data. The voice recognition and voice output unit 211 converts voice data received from the outside or message data held in advance into a voice signal and outputs as voice from the speaker 202.

Figure 3:
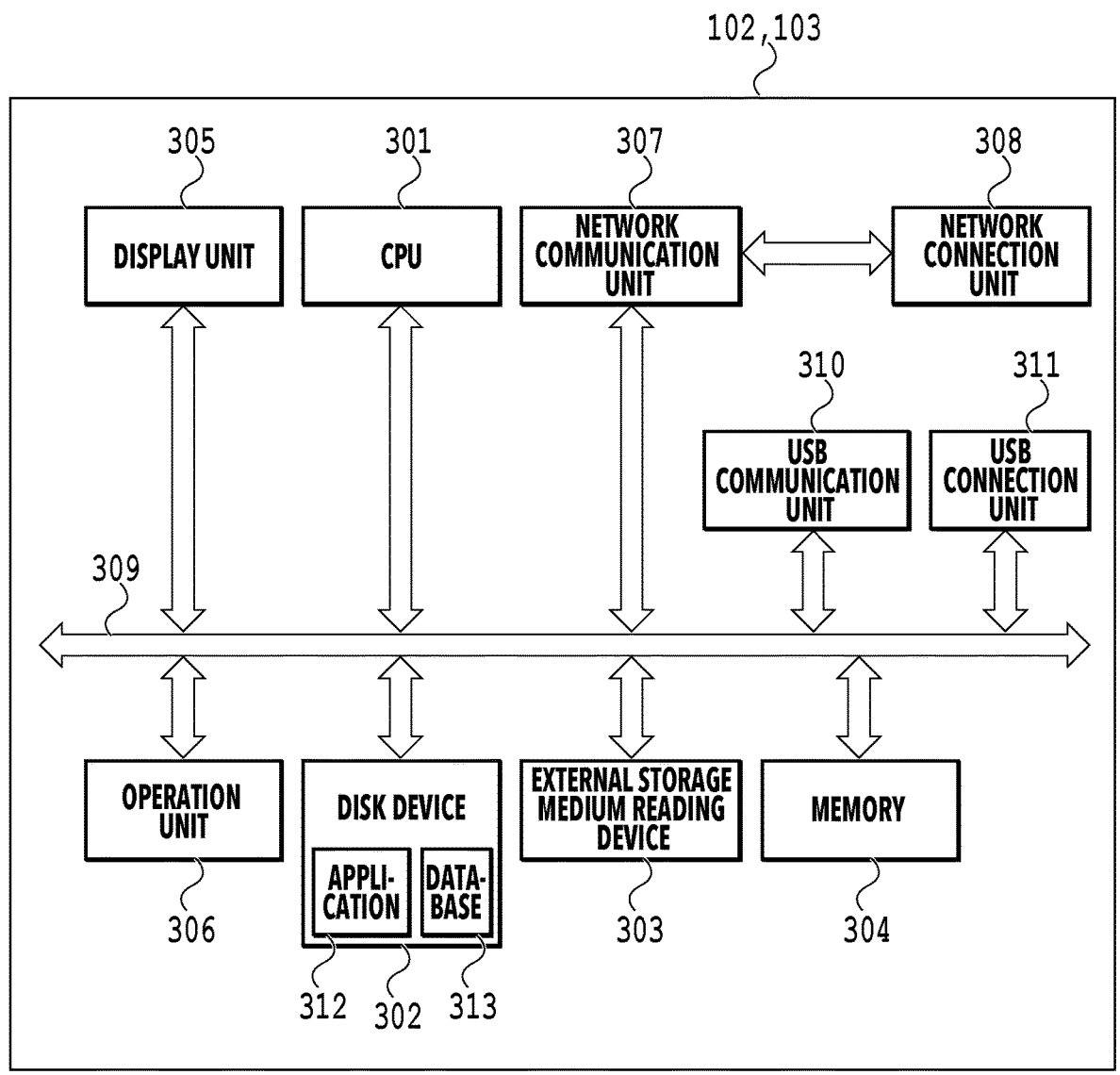
FIG. 3 is a diagram illustrating a configuration example of hardware of a server system according to the embodiment.

FIG. 3 is a diagram illustrating an example of a hardware configuration of the information terminal management server 102 and the relay server 103 forming the server system according to the present embodiment. The information terminal management server 102 and the relay server 103 according to the present embodiment have a common configuration; for this reason, hereinafter, the configuration is described using the information terminal management server 102 as an example.

A CPU 301 is a central processing device (control unit) that controls the overall information terminal management server 102. A disk device 302 is a secondary storage device and stores not only an application 312, a database 313, an OS, and the like but also various files and data. An external storage medium reading device 303 is a device that reads information such as a file stored in an external storage medium including an SD card. A memory 304 is a temporary storage device and is formed of a RAM or the like. The CPU 301 performs temporal storage, buffering, and so on of data on the memory 304 as needed.

A display unit 305 is formed of an LCD, for example, and displays various types of information. An operation unit 306 includes a keyboard, a mouse, and the like for the user to perform various input operations and is able to accept an instruction and an operation from the user. A network communication unit 307 is connected with a network such as the Internet through a network connection unit 308 and establishes various communications. The network connection unit 308 corresponds to a network medium such as a wired LAN and a wireless LAN. In a case of corresponding to a wired LAN, the network connection unit 308 is a connector for connecting a cable of a wired LAN, for example, and in a case of corresponding to a wireless LAN, the network connection unit 308 is an antenna, for example. The network connection unit 308 may correspond to both the wired LAN and wireless LAN, and the network connection unit 308 and the network communication unit 307 form a transmission unit, a reply unit, a first reception unit, and a second reception unit. A USB communication unit 310 is connected with each of surrounding devices through a USB connection unit 311 and establishes various communications.

The constituents illustrated in FIG. 3 are communicably connected to each other through a bus 309. An operation of the information terminal management server 102 (or the relay server 103) in the present embodiment is, for example, implemented by the CPU 301 that loads a program required for processing from the disk device 302 into the memory 304 and executes the program. The voice recognition function of the voice recognition and voice output unit 211 illustrated in FIG. 2 may be included in the configuration in FIG. 3. In this case, a server system (for example, the information terminal management server 102) including the constituents in FIG. 3 can phonetically recognize the voice signal transmitted from the information terminal 101 and extract a predetermined word.

Figure 4:
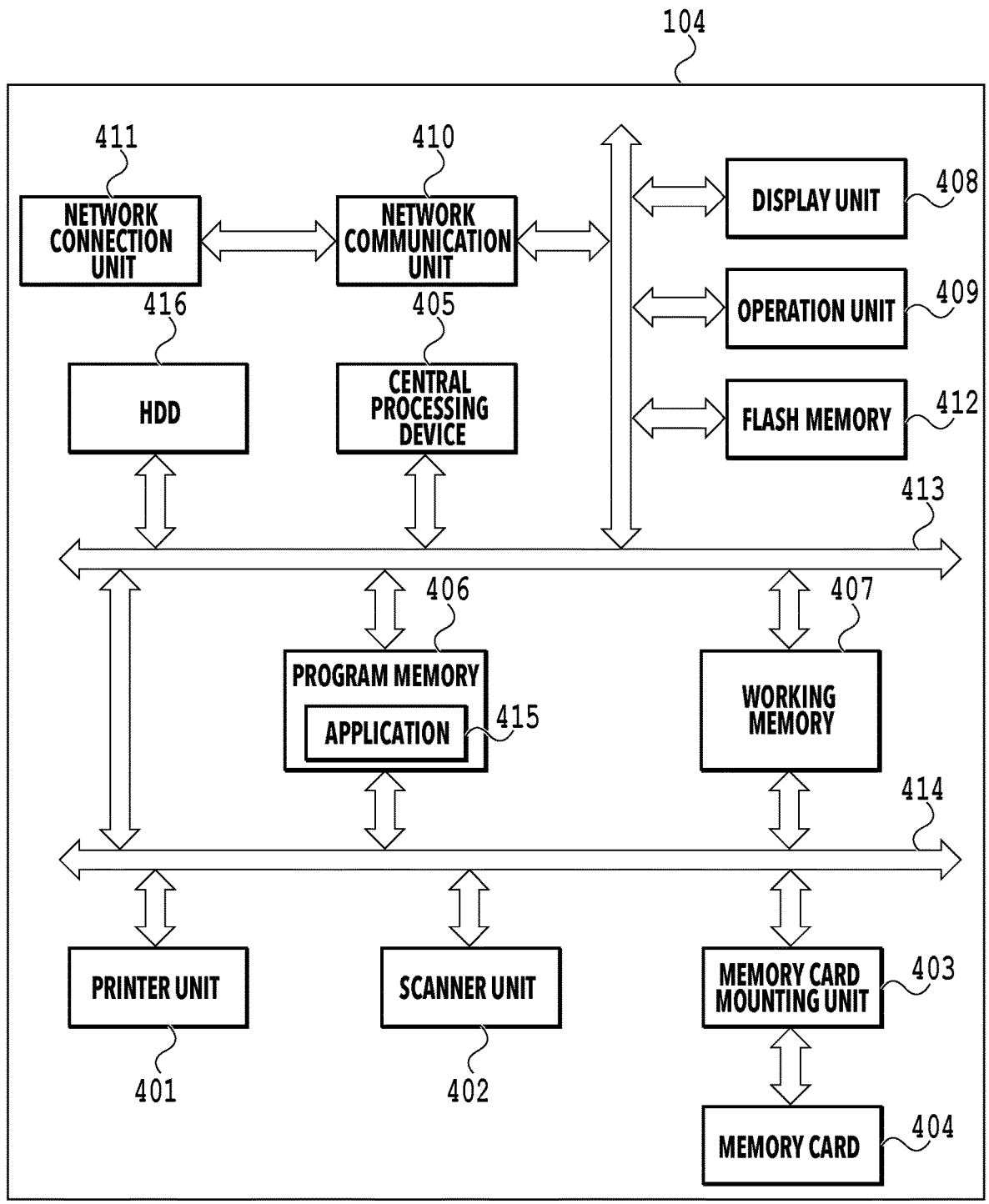
FIG. 4 is a diagram illustrating a configuration example of hardware of an MFP according to the embodiment.

FIG. 4 is a diagram illustrating an example of a hardware configuration of the multi function printer (MFP) 104 according to the present embodiment. In the present embodiment, the MFP 104 is described; however, as long as the device has the printing function, it is not limited to the MFP, and a device in another form may be used. For example, an image processing device, a copier, a facsimile, a printing device with a single function, and the like may be used.

In the MFP 104, the printing function is implemented by a printer unit 401, the scanner function is implemented by a scanner unit 402, and the storage function is implemented by a memory card mounting unit 403 and a memory card 404. The above constituents are communicably connected to each other by a bus 414.

The printer unit 401 records image data received from the outside, image data stored in the memory card 404, and the like onto a printing medium such as a printing sheet by a recording method such as an inkjet recording method and an electrophotographic method. The printer unit 401 manages information on consumable members that is, for example, ink information including a remaining amount of ink and sheet information such as the number of stacked sheets.

The scanner unit 402 optically reads a document set on a platen glass (not illustrated) to convert the document into electronic data and converts the electronic data into image data in a specified file format. Additionally, the scanner unit 402 is able to transmit the converted image data to an external device by way of the network and is also able to store the converted image data into a storage region such as an HDD 416. In the copy service, image data is generated with the document put on the platen glass being read by the scanner unit 402, and the image data is transferred to the printer unit 401. Based on the transferred image data, the printer unit 401 performs printing on a printing medium such as a printing sheet.

Various types of file data are stored in the memory card 404 mounted in the memory card mounting unit 403. The file data in some cases may be read from an external device through the network to be edited. The file data in some cases may be stored from an external device into the memory card 404.

The MFP 104 includes a CPU 405, a program memory 406, a working memory 407, a display unit 408, an operation unit 409, a network communication unit 410, a network connection unit 411, and a flash memory 412. The CPU 405 is a central processing device that controls overall the units in the MFP 104. The program memory 406 is formed of a ROM or the like and stores various program codes and an application 415 for, for example, establishing the communication with an external server. The application 415 is also able to obtain information on consumables such as ink and sheets by accessing the printer unit 401. The working memory 407 is formed of a RAM or the like and temporarily stores or buffers image data and the like in a case of execution of each service. The display unit 408 is formed of an LCD, for example, and displays various types of information such as a user interface screen. The operation unit 409 includes a keyboard, a mouse, a switch, and the like and is able to accept an instruction and an operation from the user. The network communication unit 410 establishes various communications by connecting the MFP 104 to the network through the network connection unit 411.

The network connection unit 411 corresponds to a network medium such as a wired LAN and a wireless LAN. In a case of corresponding to a wired LAN, the network connection unit 411 is a connector for connecting a cable of a wired LAN, for example, and in a case of corresponding to a wireless LAN, the network connection unit 411 is an antenna, for example. The network connection unit 411 may correspond to both the wired LAN and wireless LAN. The flash memory 412 is a non-volatile memory for storing the image data received by the network communication unit 410 and the like. The above-described constituents are communicably connected to each other through a bus 413. There may be a block that performs data conversion between the bus 414 and the bus 413. An operation of the MFP 104 in the present embodiment is, for example, implemented by the CPU 405 that reads a program required for processing from the program memory 406 into the working memory 407 and executes the program.

The configuration of each device illustrated in FIGS. 2 to 4 is an example, and each device may include hardware other than the illustrated ones. In FIGS. 2 to 4, multiple blocks may be integrated as a single block, or a single block may be divided into two or more blocks. That is, the constituents in each device illustrated in FIGS. 2 to 4 may have another configuration as long as they are able to execute the later-described processing of the present embodiment.

Figure 5:
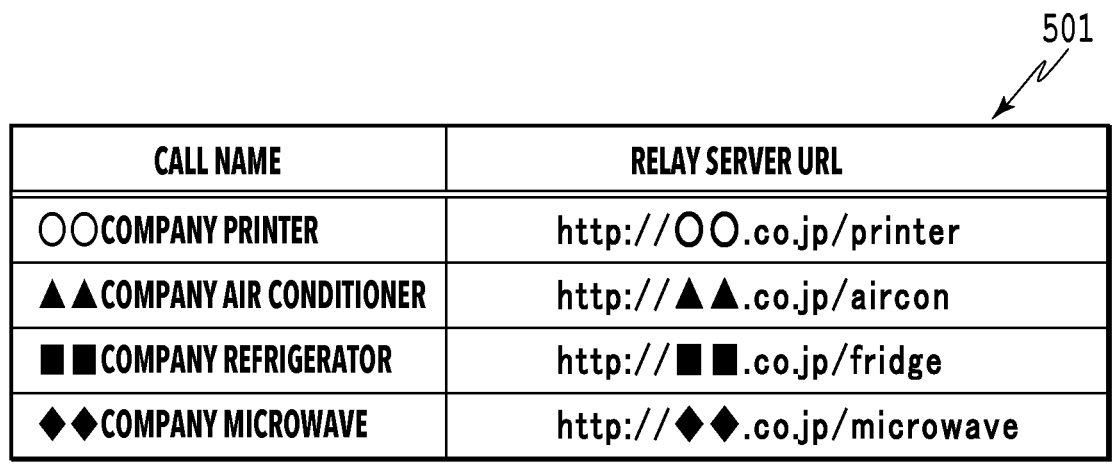
FIG. 5 is a diagram illustrating an example of information registered in a server management DB according to a first embodiment.

FIG. 5 is a diagram illustrating an example of information registered in a server management DB 501 of the information terminal management server 102. In the server management DB 501, a call name and a URL of the relay server 103 corresponding to the call name are registered in combination with each other. In a case where the instruction information is transmitted from the information terminal 101, the information terminal management server 102 refers to the server management DB 501 and, based on the call name included in the instruction information, specifies the URL of the relay server 103 that is a transfer destination of a command included in the instruction information.

Figure 6:
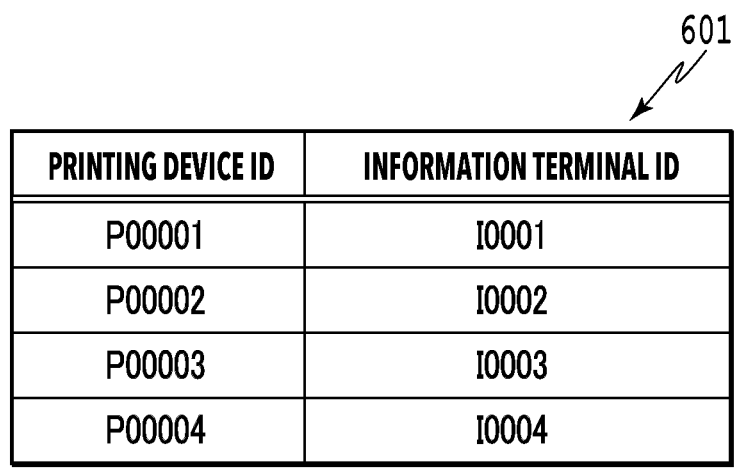
FIG. 6 is a diagram illustrating an example of information registered in a link management DB according to the first embodiment.

FIG. 6 is a diagram illustrating an example of information registered in a link management DB 601 in the relay server 103. In the link management DB 601, a printing device ID and an information terminal ID are registered in association with each other, and once either one of the IDs are designated, the other ID as a link target is specified. For example, if an information terminal ID (I0001) is designated, a printing device ID (P00001) is specified.

Figures 7A, 7B:
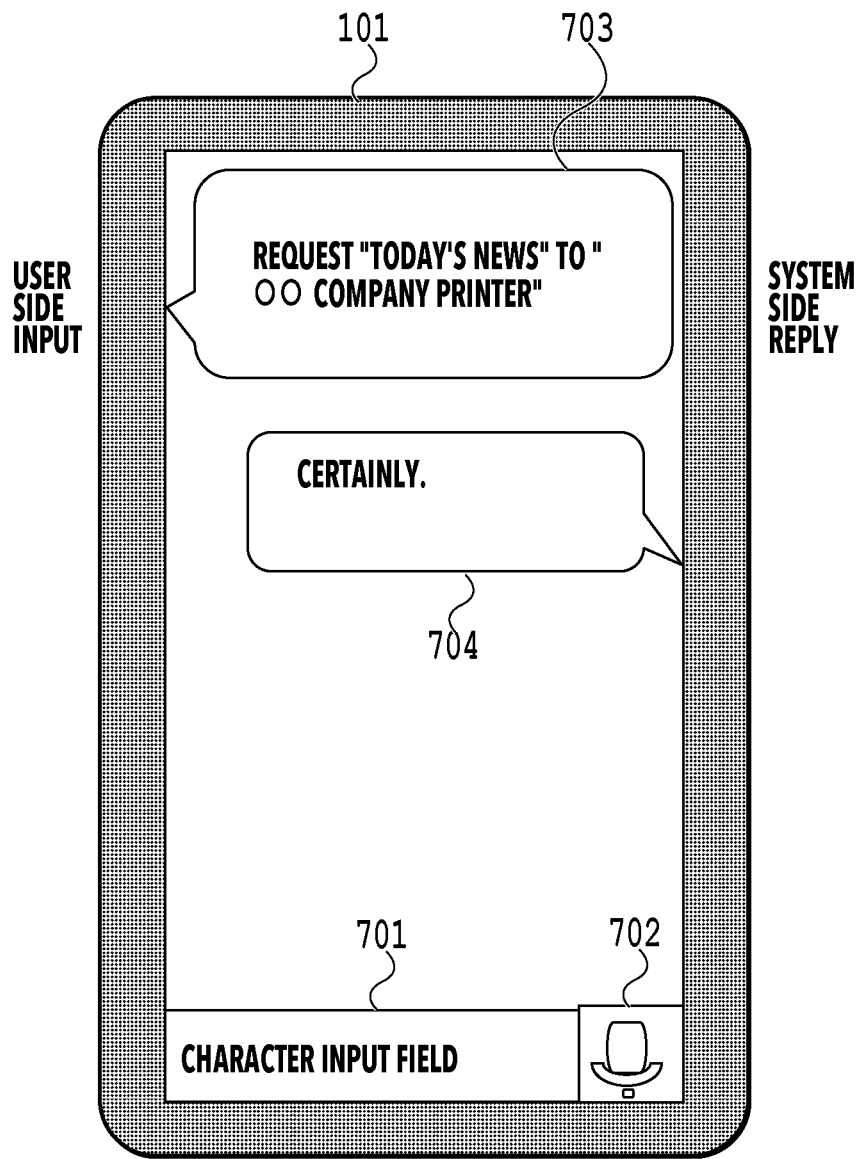
FIGS. 7A and 7B are diagrams illustrating a command of a user side and a reply of a system side displayed on an information terminal.

FIGS. 7A and 7B are diagrams describing a command inputted to the information terminal 101. In FIG. 7A, a dialogue balloon display from the left side of the information terminal 101 indicates an inputted content of the user, while a dialogue balloon display from the right side of the information terminal 101 indicates a reply content transmitted from a system side (the information terminal management server 102 side). The user can input a command by performing text input to a character input field 701 of the information terminal 101. With a voice input button 702 being pressed, a command can be inputted with voice. The CPU 203 of the information terminal 101 performs processing of receiving the inputted command and thereafter displays a received command 703 on a screen of the display unit 201. Once the information terminal 101 receives a reply 704 from the information terminal management server 102 to the command from the information terminal 101, the CPU 203 drives the display unit 201 or the speaker 202 and outputs a screen or voice.

As illustrated in FIG. 7B, the command 703 inputted from the information terminal 101 is divided into a call part 705 and a command part 706 depending on the contents thereof. The call part 705 is a part indicating the relay server 103 to be linked with. In the present embodiment, the content of the call part 705 is referred to as a "call name". The relay server 103 and the information terminal 101 corresponding to the call name are able to be linked with each other through the information terminal management server 102. Additionally, the command part 706 is a part specifically instructing a device that is, for example, the MFP 104 linked with the information terminal 101 through the relay server 103 about the details of the processing to be executed.

Figure 8:
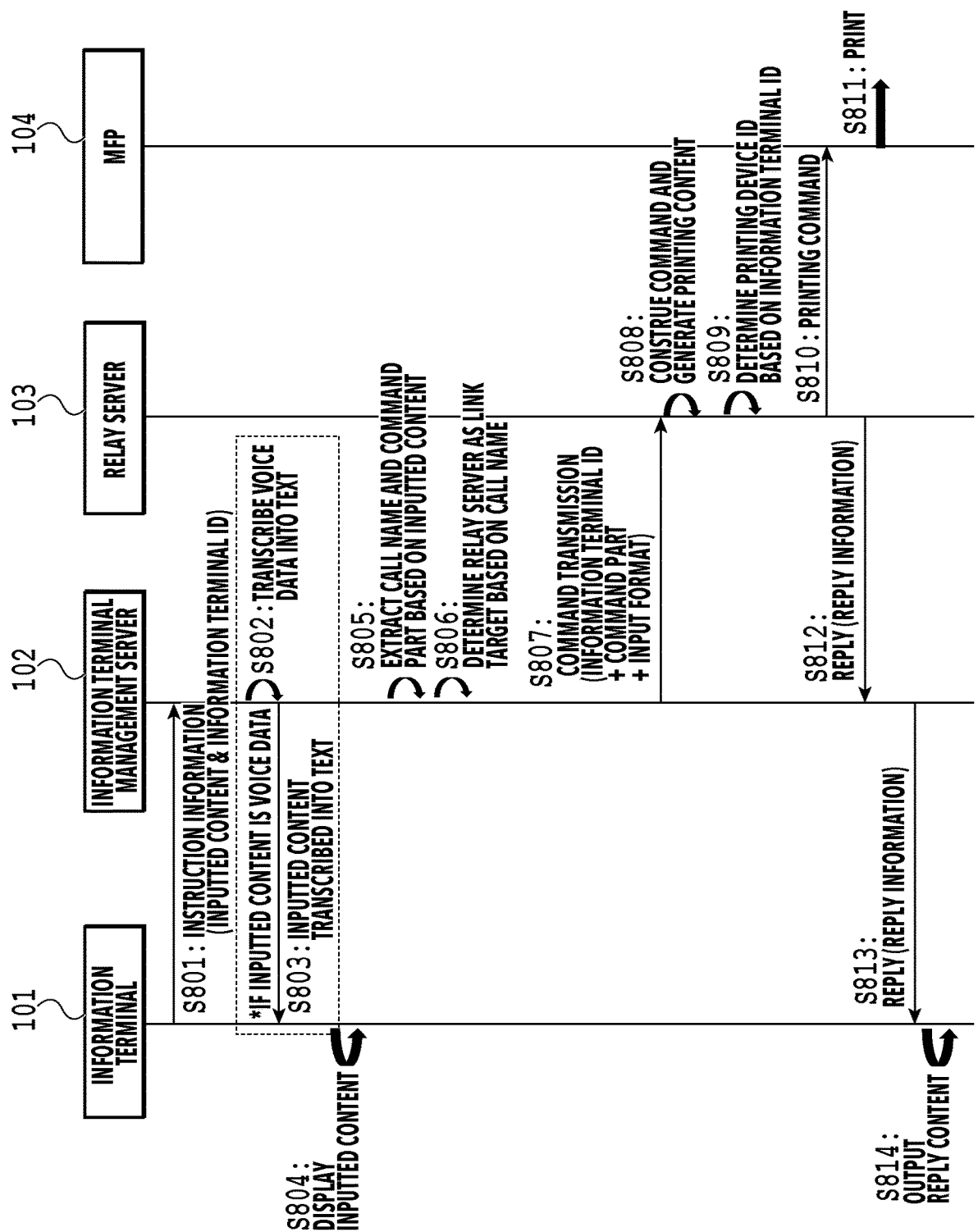
FIG. 8 is a sequence diagram illustrating processing executed by a printing control system according to the first embodiment.
Figure 9:
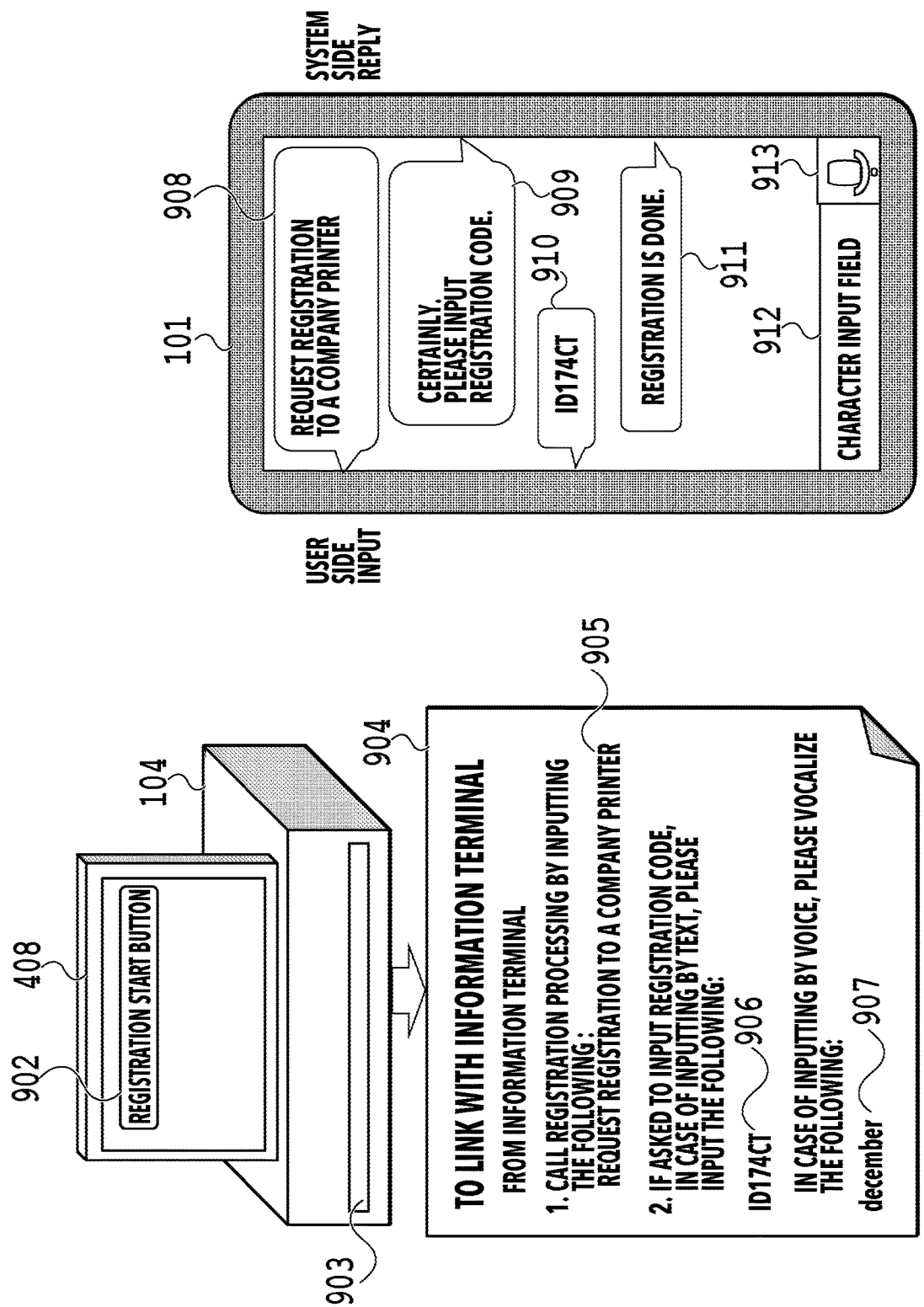
FIGS. 9A and 9B are diagrams illustrating registration procedure information outputted by the MFP and displayed contents on the information terminal in the first embodiment.

FIG. 8 is a sequence diagram illustrating processing executed by the printing control system according to the present embodiment and illustrates a sequence until the MFP 104 linked with the information terminal 101 performs printing in a case where a printing command that instructs about the printing by the MFP 104 is inputted from the information terminal 101. The series of processing illustrated in the sequence in FIG. 8 is executed by each CPU of the information terminal 101, the information terminal management server 102, the relay server 103, and the MFP 104 that are the constituents of the printing control system 100. That is, the processing is performed by the CPU of each constituent that deploys the program code stored in the ROM or the external memory into the RAM and executes the program. Otherwise, some of or all the functions of the steps in FIG. 8 may be implemented by hardware such as an ASIC, an electronic circuit, or the like. A sign "S" in the description of each processing in each sequence diagram and flowchart referred to in the description of each processing means that it is a step in the sequence diagram. Hereinafter, the CPU information terminal 101, the information terminal management server 102, the relay server 103, and the MFP 104 play central roles in each processing. An arrow in a right and left direction illustrated in FIG. 8 indicates the communication between the constituents in the printing control system 100 in the present embodiment, and a straight line in a top and bottom direction indicates a lapse of time. The above description is also applied to other sequence diagrams in the present specification.

Once the user inputs the instruction command (the command) to the information terminal 101, the information terminal 101 transmits as the instruction information the own information terminal ID and the inputted content to the information terminal management server 102 (S801). The information terminal 101 displays the inputted content on the screen of the information terminal 101 (S804). However, in a case where the input is voice data, after the information terminal management server 102 transcribes the voice data into text (S802), the information terminal 101 may be notified of the inputted content transcribed into text (S803), and the information terminal 101 may display the inputted content transcribed into text (S804).

The information terminal management server 102 extracts the call name 705 and the command part 706 from the information on the inputted content transcribed into text (S805). The information terminal management server 102 refers to the server management DB 501 illustrated in FIG. 5 to determine the relay server 103 as a link target corresponding to the call name 705 (S806), and obtains the URL of the relay server 103. Additionally, the information terminal management server 102 performs command transmission (transmission of the information terminal ID, the command part 706 (FIG. 7B), and the input format information in the information terminal 101) to the relay server 103 (S807). In a case of the present embodiment, the information terminal management server 102 transmits the information terminal ID, information on a command "request of printing today's news", and information representing an input format (the input format information) to the relay server 103 corresponding to a call name "○○ company printer" illustrated in FIG. 7B. As the input format information, for example, in a case where the input to the information terminal 101 is text input, "text" is transmitted, and in a case where it is voice input, "voice" is transmitted.

In response to the command from the information terminal management server 102, the relay server 103 generates printing contents in accordance with the contents of the command (S808). For example, the relay server 103 generates printing contents related to today's news in accordance with the above-described command. Next, the relay server 103 refers to the link management DB 601 illustrated in FIG. 6 to determine, based on the information terminal ID transmitted with the command, the printing device ID of the printing device to be caused to execute the printing (S809). The relay server 103 then commands the printing device (the MFP 104) having the determined printing device ID to print the printing contents (S810). The MFP 104 prints the printing contents in accordance with the command received from the relay server 103 (S811).

Thereafter, the relay server 103 replies reply information to the user to the information terminal management server 102 (S812). Once receiving the reply information, the information terminal management server 102 transmits the reply information to the information terminal 101 (S813). The information terminal 101 performs screen display or voice output based on the reply information received from the information terminal management server 102 (S814).

In order to allow for an operation to control the operation of the MFP 104 by using the information terminal 101 as described above, registration processing for registering the association to link the MFP 104 and the information terminal 101 needs to be performed in advance. In order to execute this registration processing, the relay server 103 generates a registration code, which is for each input format in the information terminal 101 and is appropriate for the input format, as a registration code corresponding to the MFP 104. That is, in a case where the information terminal 101 allows for (supports) the input in multiple input formats, a registration code in accordance with each input format is generated as the registration code of the MFP 104. For example, in a case where two input formats that are text input and voice input are available like the information terminal 101 illustrated in FIG. 7A, a registration code for voice input and a registration code for text input are generated. In a case where a registration code is inputted by voice input from the information terminal 101, the registration code for voice input is vocalized to perform voice input, and in a case where text input registration is performed, a registration code for text input is inputted from a keyboard. This registration processing is described below in more detail with reference to FIGS. 9A to 12.

FIGS. 9A and 9B are diagrams describing registration procedure information outputted from the MFP and displayed contents on the information terminal in the first embodiment. The MFP 104 includes the display unit 408 for performing an input operation. On the display unit 408, various user interface screens such as device information, a setting screen, and job information are displayed. In the present embodiment, the display unit 408 is a touch panel that also has the function of the operation unit 409. The display unit 408 displays a registration start button (an issue request unit) 902 that makes a registration start request (an issue request of a registration code) to start the registration processing for linking the information terminal 101 and the MFP 104. Once the registration start button 902 is pressed, an issue request to request issuing of a registration code is generated from the MFP 104 and is transmitted to the relay server 103. After the later-described issue processing of the registration code, the relay server 103 that receives the issue request replies printing data of registration procedure information 904 (FIG. 9A) for the information terminal registration including the registration code to the MFP 104. The MFP 104 performs the printing operation in accordance with the printing data and discharges a sheet, on which the registration procedure information 904 is described, as a printed product from a discharge port 903.

The user performs an operation of registering the MFP 104 on the information terminal 101 in accordance with the sentences described in the registration procedure information 904. For example, in a case where the registration is performed by text input, input is made from a character input field 912 in the information terminal 101. In a case where the registration processing for associating the information terminal 101 with the MFP 104, the user first inputs a registration-function-call 905 to the information terminal 101. In accordance with the input, the information terminal 101 makes a display 908 representing the inputted content. Additionally, the information terminal 101 displays a reply content 909 represented by the reply information transmitted from the relay server 103 through the information terminal management server 102 on the screen. The reply content 909 is a sentence encouraging the input of the registration code.

Next, the user inputs a registration code 906 for text input to the information terminal 101. In accordance with the input of the registration code 906 for text input (in the present example, ID174CT), the information terminal 101 makes a display 910 of the inputted content. After the registration of the MFP 104 is done, a registration completion notification 911 is displayed. In a case where the registration processing of the MFP 104 is performed by voice input, the user vocalizes to input the registration code while pressing a voice input button 913. In this process, the inputted registration code is a registration code 907 for voice input (for example, "december"). Accordingly, the display 910 of the inputted content is "december" instead of "ID174CT".

In addition, all the input during the registration processing may be performed by text input or by voice input. Only the part of inputting the registration code may be performed by the input in another input format. For example, the registration-function-call instruction 905 may be made by voice input, and input of the registration code may be performed with text. In this case, the registration code 906 for text input is used as the registration code to be inputted.

Figure 10:
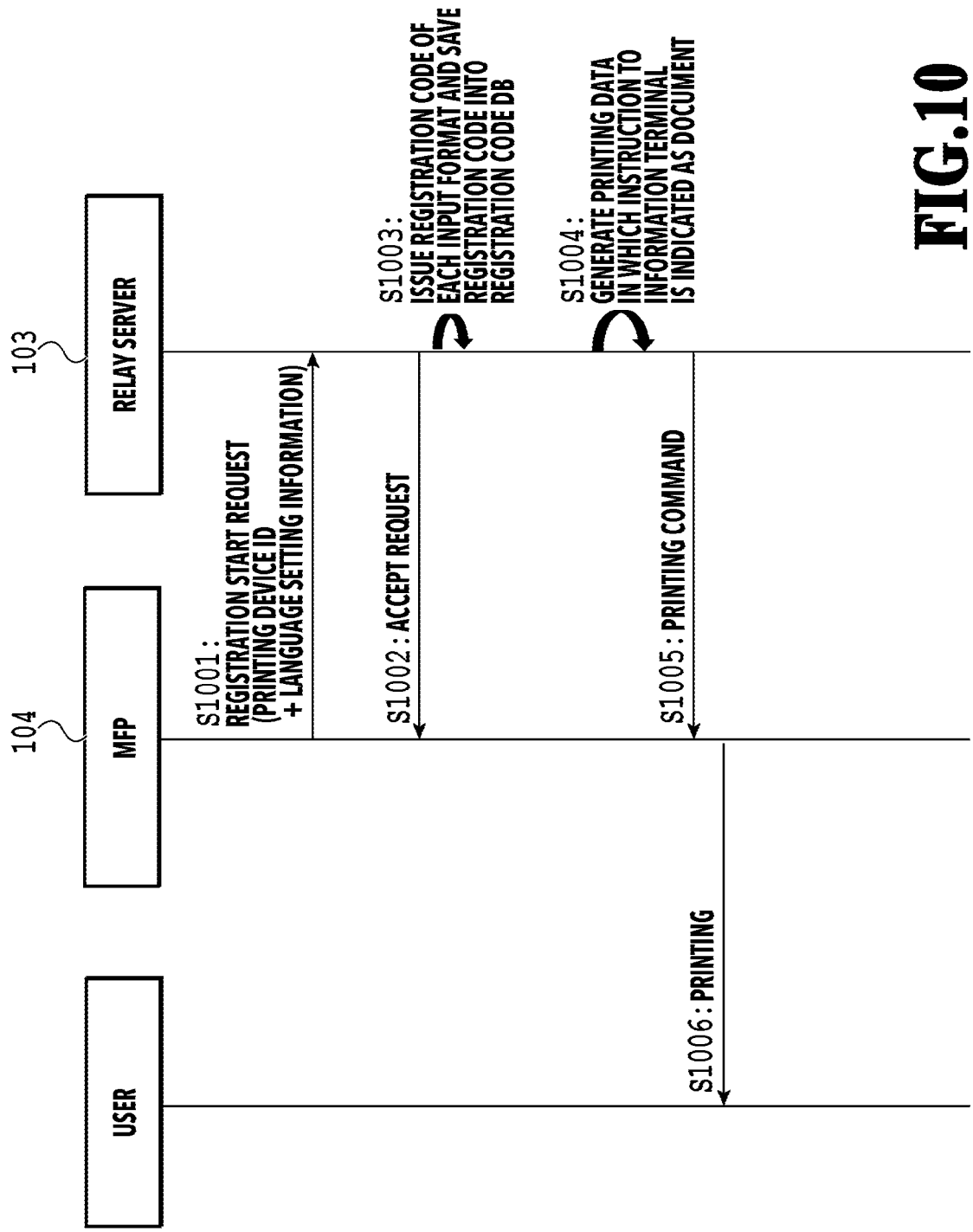
FIG. 10 is a sequence diagram illustrating a procedure of issue processing of a registration code of the MFP according to the first embodiment.

FIG. 10 is a sequence diagram illustrating a procedure of the issue processing of the registration code of the MFP 104 according to the first embodiment. As with FIG. 8, an arrow in the right and left direction illustrated in FIG. 10 indicates the communication between the MFP 104 and the relay server 103, and a straight line in the top and bottom direction indicates a lapse of time.

Once the user presses the registration start button 902 (FIG. 9A) of the MFP 104, the MFP 104 transmits the registration start request (the issue request of the registration code) including the own printing device ID and current language setting information set to the MFP 104 to the relay server 103 (S1001). The language setting information transmitted to the relay server 103 may be information indicating a language other than the language set to the MFP 104. In this case, a screen for selecting from multiple languages may be displayed on the display unit 408 (FIG. 9A), and the language setting information indicating the language selected therefrom by the user may be transmitted to the relay server 103.

Once receiving the registration start request from the MFP 104, the relay server 103 transmits reply information indicating acceptance (S1002). Additionally, the relay server 103 issues a registration code for each input format and also saves the issued registration code and the received printing device ID into a registration code DB 1101 illustrated in FIG. 11 in association with each other (S1003). In the present embodiment, both the registration code for text input and registration code for voice input are issued, and the registration codes are saved into the registration code DB 1101 in association with the same printing device ID. The registration code for text input may be a complicated code including a series of alphabets and numbers that is on the premise of conventional keyboard input. The relay server 103 holds a registration code dictionary that includes words and sentences that are phonetically recognized easily in each language, which are, for example, words and sentences including no homonyms. As the registration code for voice input, a registration code is issued from the registration code dictionary by using the language indicated in the language setting information received from the MFP 104. Additionally, the relay server 103 controls and causes the MFP 104 to print and output the registration procedure information including information such as the registration code. In the present embodiment, the relay server 103 generates printing data of the registration procedure information in which the registration code for each input format is embedded in a sentence instructing the user to perform the input operation for performing the registration processing (S1004), and transmits a printing command including the printing data to the MFP 104 (S1005). The MFP 104 that receives the printing command performs printing based on the printing data (S1006). Thus, the registration procedure information 904 is outputted as a printed product.

Figure 11:
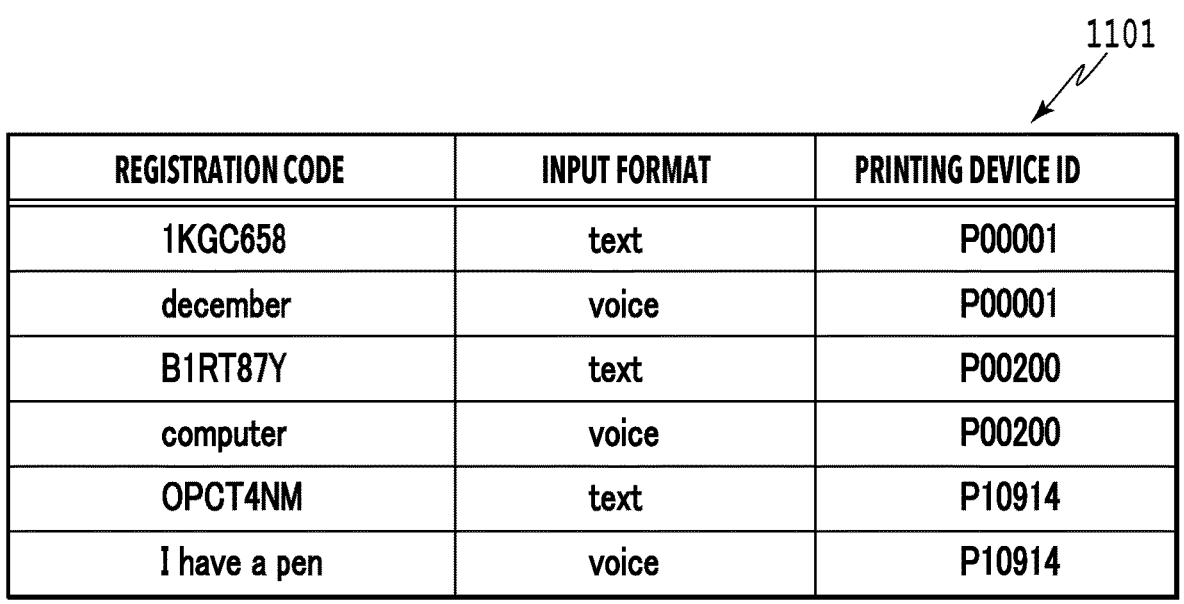
FIG. 11 is a diagram illustrating a configuration example of a registration code DB according to the first embodiment.

FIG. 11 is a diagram illustrating a configuration example of the registration code DB 1101 in the relay server 103. In S1003 in FIG. 10, the input format information, the registration code for each input format, and the printing device ID are saved in association with each other. That is, for each of the multiple printing device IDs, a registration code for text input in an input format of "text" is saved, and also a registration code for voice input in an input format of "voice" is saved. For example, for a printing device ID of "P00001", a registration code for text input "1KGC658" in the input format of "text" is saved, and also "december" is saved as the registration code for voice input in the input format of "voice". For example, for a printing device ID of "P00200", "B1RT87Y" is saved as the registration code for text input in the input format of "text", and "computer" is saved as the registration code for voice input in the input format of "voice".

Figure 12:
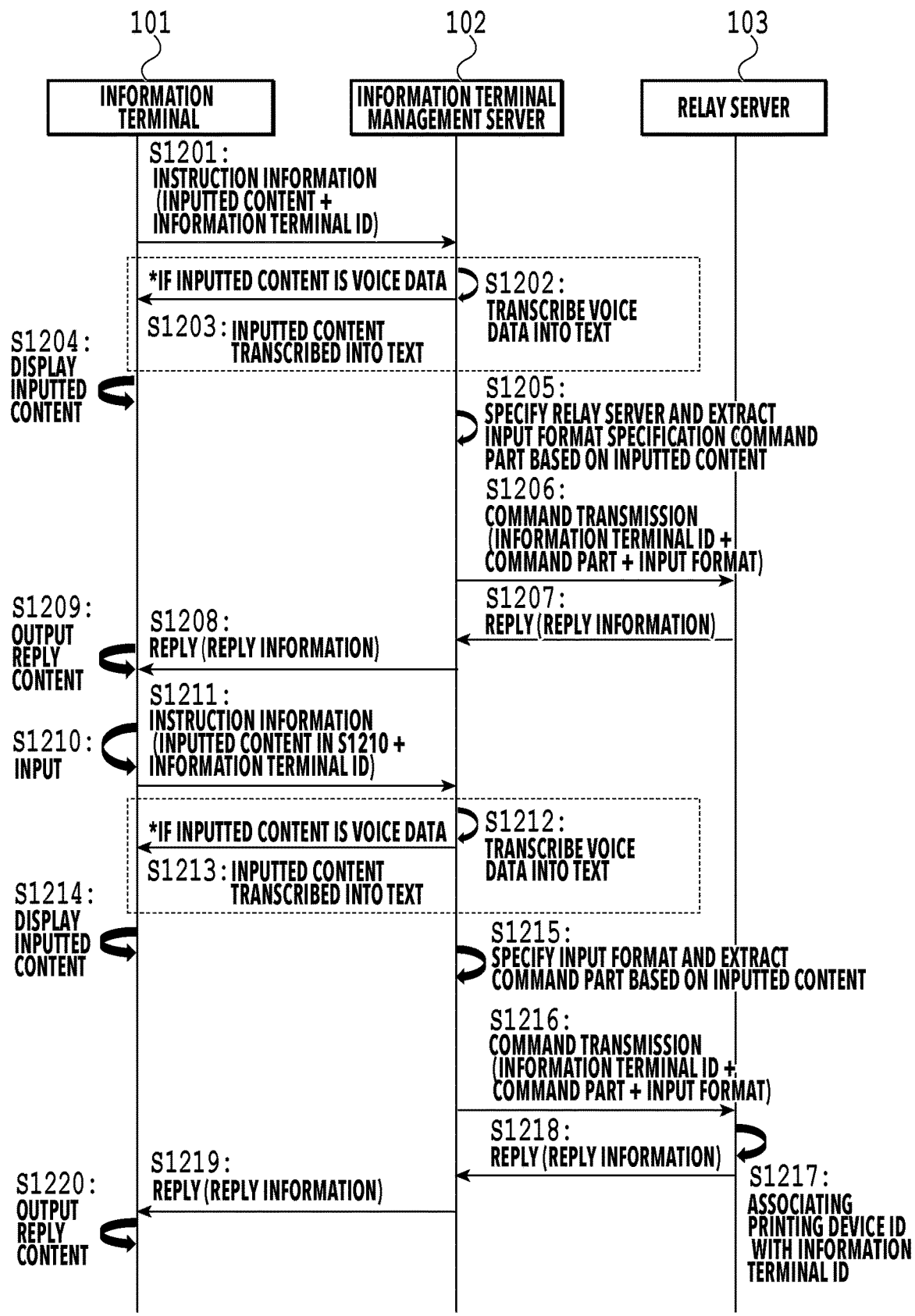
FIG. 12 is a sequence diagram illustrating a registration procedure for registration of the association between the MFP and the information terminal according to the first embodiment.

FIG. 12 is a sequence diagram illustrating a procedure of the registration processing to link the information terminal 101 and the MFP 104. As with FIG. 9B, an arrow in the right and left direction in FIG. 12 indicates the communications between the information terminal 101, the information terminal management server 102, and the relay server 103, and a straight line in the top and bottom direction indicates a lapse of time.

The following registration processing is started with the user inputting the registration-function-call instruction 905 from the information terminal 101 in accordance with the description of the registration procedure information 904 (FIG. 9A) for the information terminal registration outputted from the MFP 104 by the above-described issue processing of the registration code. That is, once the user inputs the registration-function-call instruction 905 to the information terminal 101, the information terminal 101 transmits the inputted content (the call instruction 905) with the own information terminal ID to the information terminal management server 102 as the instruction information (S1201). The information terminal 101 makes the display 908 (FIG. 9B) representing the inputted content (the call instruction 905) (S1204). In a case where the inputted content is voice data, as with the processing S802 and the processing S803 in FIG. 8, the voice data may be transcribed into text by the information terminal management server 102 (S1202), and the information terminal 101 may be notified of the inputted content transcribed into text (S1203). In this case, on the information terminal 101, the inputted content transcribed into text is displayed (S1204).

Based on the inputted content of the instruction information transmitted from the information terminal 101, the information terminal management server 102 specifies the relay server 103 to be linked with and also the input format and also extracts the command part (S1205). In this process, once recognizing that the command part is a call of the registration function, the information terminal management server 102 performs the command transmission (transmission of the information terminal ID, the input format information, and the command part (the registration-function-call instruction)) to the relay server 103 (S1206). Once receiving the registration-function-call instruction, the relay server 103 replies the reply information encouraging input of the registration code to the information terminal management server 102 (S1207). The information terminal management server 102 replies the reply information replied from the relay server 103 to the information terminal 101 (S1208). The information terminal 101 that receives the reply information outputs the reply content 909 encouraging input of the registration code (a display on the screen) (S1209).

In S1210, the information terminal 101 accepts the input of the registration code from the user. Once the user inputs the registration code to the information terminal 101, the information terminal 101 transmits the own information terminal ID and the inputted content (the registration code) to the information terminal management server 102 as the instruction information (S1211). The information terminal 101 displays the inputted content (the registration code) from the user on the screen of the information terminal 101 (S1214). In a case where the inputted content is voice data, the information terminal management server 102 transcribes the voice data into text (S1212) and transmits the inputted content transcribed into text (the registration code for the voice input) to the information terminal 101 (S1213). The information terminal 101 displays the inputted content transcribed into text on the screen (S1214).

On the other hand, once receiving the instruction information transmitted from the information terminal 101 in the above-described S1211, the information terminal management server 102 specifies the input format based on the inputted content of the instruction information and also extracts the command part (S1215). In the present embodiment, in a case where the data representing the inputted content is text, the input format is specified as "text", and in a case where the data representing the inputted content is voice data, the input format is specified as "voice". In a case where the data representing the inputted content is text, the command part (in this case, the inputted content itself) is the registration code for the text input, and the registration code, the information terminal ID, and the specified input format information are transmitted to the relay server 103 (S1216). In a case where the data representing the inputted content is voice data, the command part (the inputted content transcribed into text) is converted into the registration code for voice input in S1212, and the registration code, the information terminal ID, and the specified input format information are transmitted to the relay server 103 (S1216).

The relay server 103 refers to the combination of the registration code, which is the command part, and the input format corresponding to the registration code in the registration code DB 1101 illustrated in FIG. 11. In a case where there is the combination of the input format and the registration code as the target in the registration code DB 1101, the relay server 103 determines that the combination of the input format and the registration code as the target is effective. The relay server 103 then saves the printing device ID corresponding to the combination of the input format and the registration code as the target into the link management DB 601 in association with the information terminal ID as illustrated in FIG. 6 (S1217). Thereafter, the relay server 103 replies the reply information indicating that the registration of the association between the information terminal 101 and the printing device (the MFP 104) is completed to the information terminal management server 102 (S1218).

Once receiving the reply information from the relay server 103, the information terminal management server 102 replies the reply information to the information terminal 101 (S1219). The information terminal 101 that receives the reply information outputs the content of the reply information, that is, a notification of the completion of the registration of the association between the information terminal 101 and the printing device (the MFP 104) by a display or voice (S1220). An example of the content outputted by the information terminal 101 is illustrated in 911 in FIG. 9B. Thus, the registration processing in the present embodiment ends.

As described above, according to the present embodiment, in the information terminal 101 capable of performing text input and voice input, the registration processing for associating and linking the information terminal with the MFP 104 can be performed by using the registration codes appropriate for each of the text input and the voice input. That is, in a case where the registration processing is performed by using a complicated registration code indicating the MFP 104, text input is performed. On the other hand, in a case where the registration processing is performed by voice input by the vocalization by the user, the registration processing is performed by using a registration code that is vocalized easily. Therefore, it is possible to properly and easily perform input of the registration code in either cases of text input and voice input, and it is possible to efficiently perform the registration processing for associating the information terminal 101 with the MFP 104. Thus, a burden on the user in the registration processing is reduced.

In the above-described embodiments, an example where the information terminal 101 is a mobile terminal such as a smartphone provided with both the voice input and text input as the input format is described; however, a mode where the information terminal is provided with either one of text input and voice input may be applicable. For example, a mode where the information terminal is audio equipment such as a smart speaker, a wearable terminal, or the like that accepts only voice input may be applicable, and also in this case, it is possible to properly and easily perform the input of the registration code by using a registration code appropriate for the voice input.

In the above-described embodiments, an example where the registration code for each input format to be presented to the user is outputted by the MFP 104 as the registration procedure information 904 as a printed product is described; however, it is not limited thereto. The registration procedure information including the registration code may be displayed on the display unit 408 of the MFP 104. In a case where the MFP 104 has a configuration capable of performing voice output, it is also possible to notify the registration code by voice. That is, a presenting unit that presents the registration procedure information including the registration code and so on is able to use an output function of the control target device (the MFP 104) as needed.

Additionally, in the above-described embodiments, the information terminal ID is used in a case of registering the association between the information terminal 101 and the printing device (the MFP 104); however, it is also possible to use identification information other than the information terminal ID. For example, it is also possible to perform the registration by inputting a service user ID for using the service of the information terminal management server 102 from an application provided in the information terminal to login the service. In this case, a web page for the MFP registration with a login function may be provided in the information terminal management server 102. With the login to the web page, the service user ID can be specified, and it is possible to perform the registration processing by using the service user ID and the registration code issued by the present embodiment.

Second Embodiment

In the printing control system according to the first embodiment, the relay server 103 issues multiple registration codes appropriate for respective multiple input formats that are assumed in the information terminal 101. In contrast, in a printing control system according to the second embodiment, the user is allowed to select in advance the input format used in a case of inputting a registration code from the information terminal, and the relay server 103 issues only the registration code in accordance with the selected input format.

Figure 13:
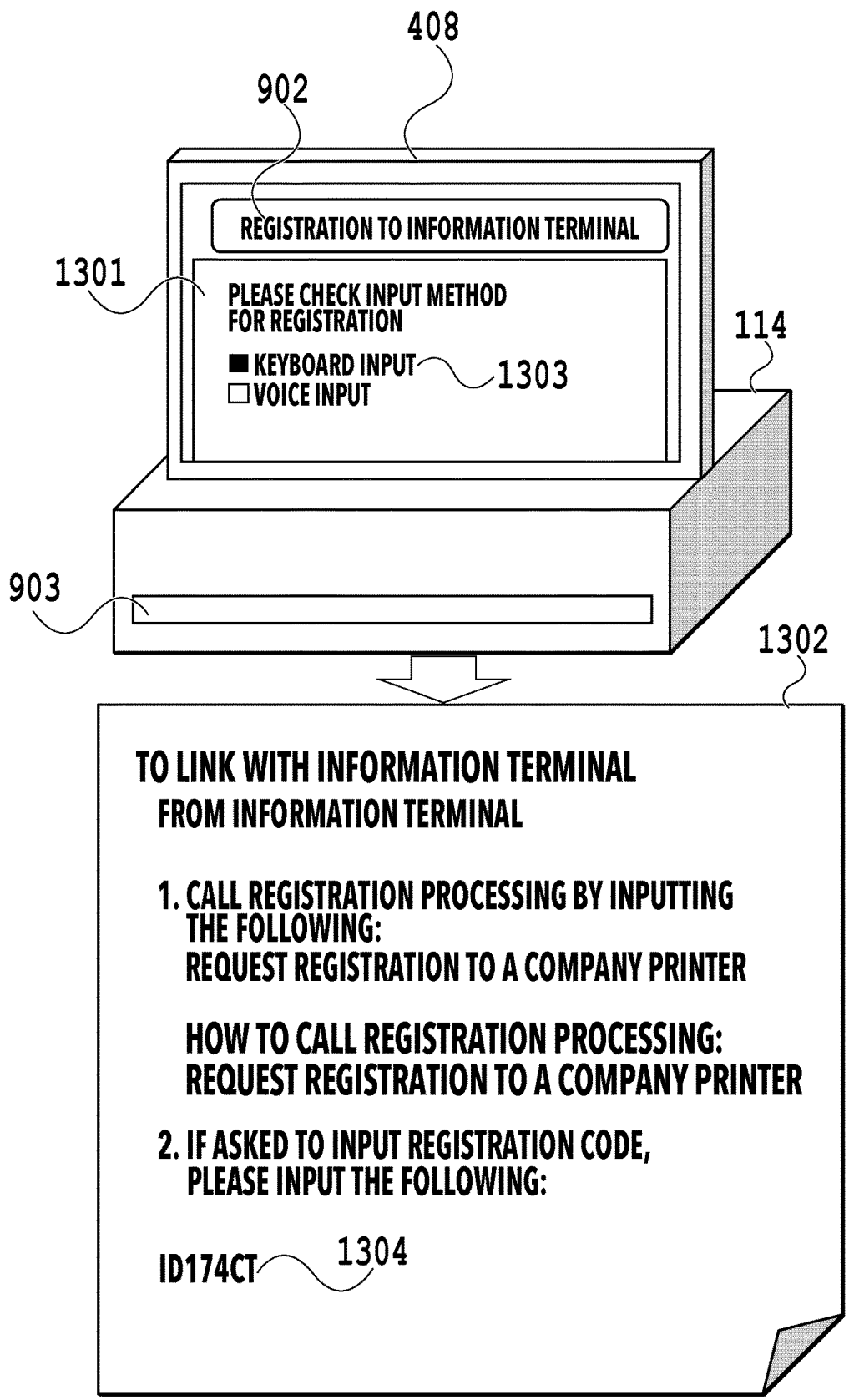
FIG. 13 is a diagram illustrating an MFP and registration procedure information in a second embodiment.

FIG. 13 is a diagram illustrating an MFP 114 in the second embodiment and registration procedure information 1302 outputted from the MFP 114 as a printed product. The display unit 408 of the MFP 114 is able to display the registration start button 902 for starting the registration into the information terminal 101, a check box 1301 for selecting the input format used by the information terminal 101 for the registration, and the like.

Once the registration start button 902 is pressed after the input format used for the registration is checked with the check box 1301, as with the first embodiment, a printed product on which the registration procedure information 1302 for the information terminal registration is printed is discharged from the discharge port 903. However, in the registration procedure information 1302 in the present embodiment, only a registration code appropriate for the input format selected with the check box 1301 is described. In the example illustrated in FIG. 13, an option 1303 of "keyboard input" is checked as the input format used by the information terminal for the registration. Therefore, in the registration procedure information 1302, only a registration code 1304 for text input (ID174CT) is described.

Figure 14:
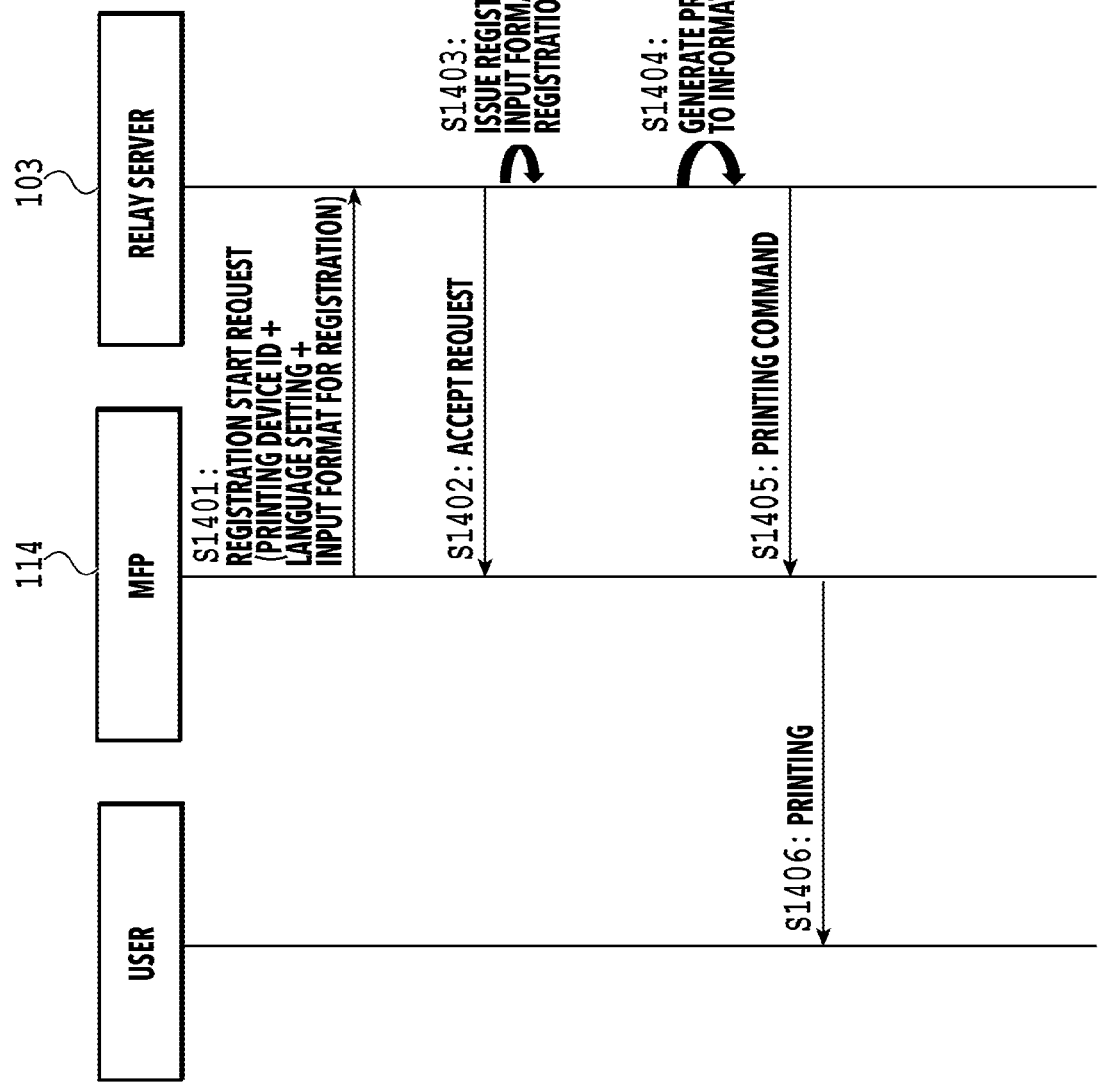
FIG. 14 is a sequence diagram illustrating issue processing of a registration code of the MFP in the second embodiment.

FIG. 14 is a sequence diagram illustrating a procedure of issuing the registration code of the MFP 104 in the present embodiment. As with FIG. 10, an arrow in the right and left direction illustrated in FIG. 14 indicates the communication between the MFP 114 and the relay server 103, and a straight line in the top and bottom direction indicates a lapse of time.

Once the user presses the registration start button 902 of the MFP 104, the MFP 104 transmits the registration start request (the issue request of the registration code) including the printing device ID, the current language setting information of the MFP 104, and the input format information for the registration to the relay server 103 (S1401). In this case, the input format information for the registration is information indicating the input format used by the information terminal 101 for the registration and is information (first selected information) indicating the input format selected with the check box 1301 for selecting that is displayed on the screen of the MFP 104.

Once receiving the registration start request from the MFP 104, the relay server 103 replies information indicating acceptance (S1402). The relay server 103 issues only the registration code appropriate for the specified input format for the registration and saves the registration code into the registration code DB 1101 (FIG. 11) in association with the printing device ID (S1403). In the example illustrated in FIG. 13, the option 1303 for "keyboard input" is checked; for this reason, the relay server 103 issues the registration code for text input "ID174CT" and saves the registration code into the registration code DB 1101. Additionally, the relay server 103 performs output control on the MFP 104. Specifically, the relay server 103 generates printing data in which the issued single registration code is embedded in a sentence instructing the user to perform the input operation for performing the registration processing (S1404), and transmits a printing command of the printing data to the MFP 104 (S1405). The MFP 104 that receives the printing command performs printing of the registration procedure information 1302 based on the printing data (S1406).

As described above, in the present embodiment, only the single registration code appropriate for the input format selected by the user is issued and presented to the user. Therefore, it is possible to make the issue processing efficient and to simplify the selection at input of the registration code. That is, the user does not input by mistake a registration code appropriate for another input format that is different from the input format selected by the user, and it is possible to perform the input of the registration code more properly and easily.

Third Embodiment

Next, a third embodiment of the present disclosure is described. As the information terminal 101 used in the printing control system, a variety of devices such as a smartphone, a smart speaker, a personal computer (PC), and so on are applicable. However, in some cases, those devices may have different input formats for inputting information. For example, a smartphone may support text input and voice input as the input format, a smart speaker may support only voice input as the input format, and a PC may support only text input as the input format. To deal with this, in the printing control system according to the third embodiment, in a case of executing the registration processing for linking the information terminal 101 and the MFP 104, the user is allowed to select in advance the type of the device used as the information terminal, and a registration code appropriate for the input format of the selected device is issued.

Figure 15:
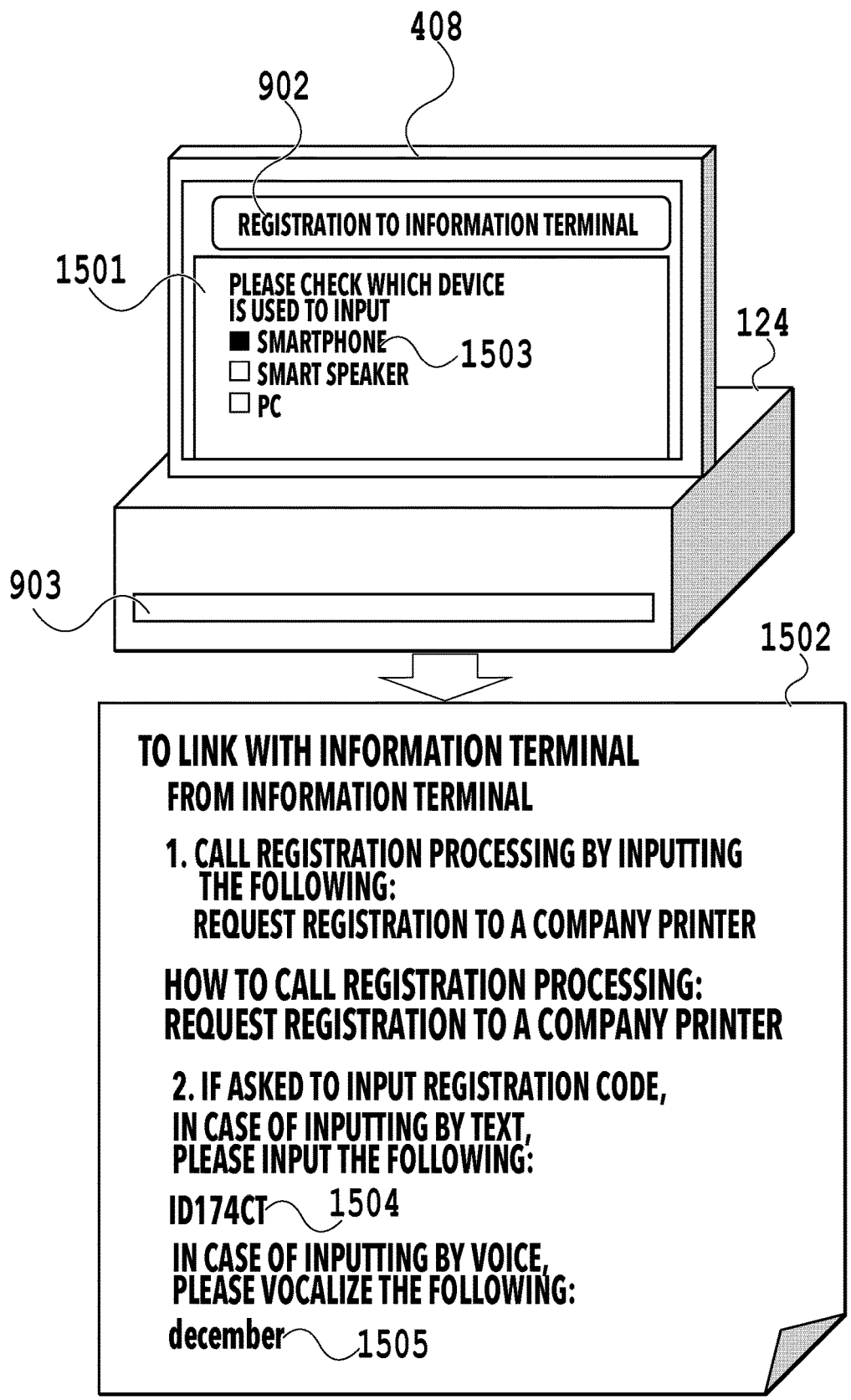
FIG. 15 is a diagram illustrating an MFP and registration procedure information in a third embodiment.

FIG. 15 is a diagram illustrating an MFP 124 in the third embodiment and registration procedure information 1502 outputted from the MFP 124. On the display unit 408 of the MFP 124, the registration start button 902 for starting the registration processing for linking the information terminal 101 and the MFP 124 and a check box 1501 for selecting a device used as the information terminal for the registration are displayed. Once the registration start button 902 is pressed after the user selects a device used for the registration with the check box 1501, the MFP 104 performs the printing operation after the later-described processing performed with the relay server 103. Thus, the registration procedure information 1502 for the information terminal registration is discharged from the discharge port 903 as a printed product. In the registration procedure information 1502, the registration code appropriate for the input format supported by the device selected with the check box 1501 is described. In the example illustrated in FIG. 15, an option 1503 of "smartphone" is checked in the check box 1501. For this reason, in the registration procedure information 1502, a registration code (ID174CT) 1504 appropriate for the text input format and a registration code (december) 1505 appropriate for the voice input format that are supported by a smartphone are described.

Figure 16:
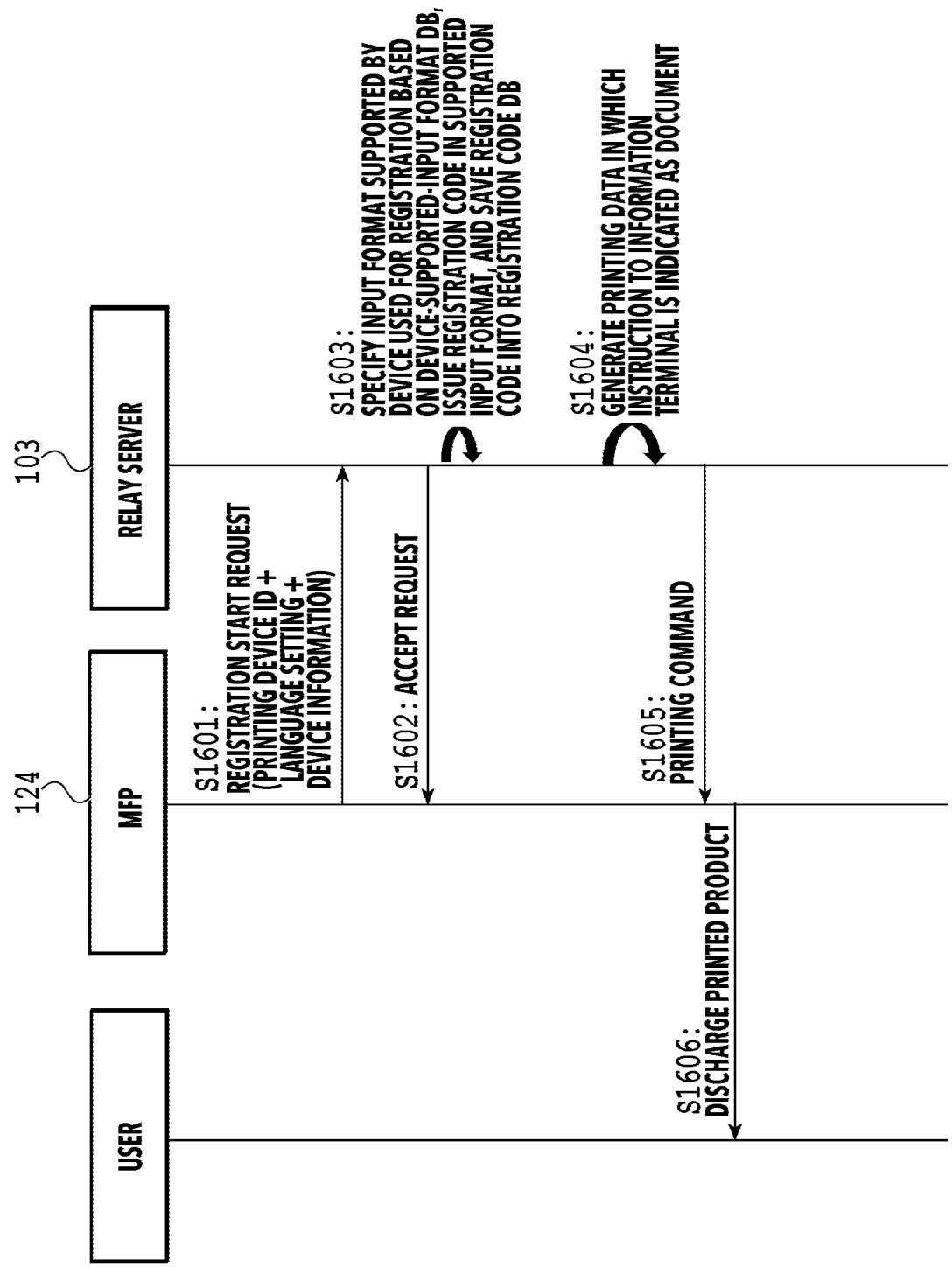
FIG. 16 is a sequence diagram illustrating issue processing of a registration code of the MFP in the third embodiment.

FIG. 16 is a sequence diagram illustrating a procedure of the issue processing of the registration code of the MFP 124 in the third embodiment. As with FIG. 10, an arrow in the right and left direction illustrated in FIG. 16 indicates the communications between the constituents, and a straight line in the top and bottom direction indicates a lapse of time.

Once the user presses the registration start button 902, the MFP 124 transmits the registration start request including the own printing device ID, the current language setting information of the MFP 124, and the device information indicating the selected device (second selected information) to the relay server 103 (S1601).

Figure 17:
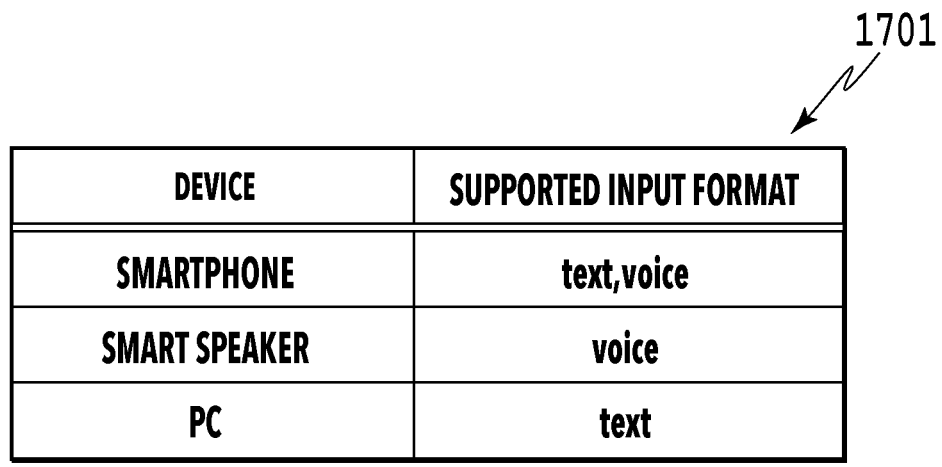
FIG. 17 is a diagram illustrating a configuration example of a device-supported-input format DB according to the third embodiment.

Once receiving the registration start request (the issue request of the registration data) from the MFP 124, the relay server 103 replies information indicating acceptance of the registration start request (S1602). Additionally, the relay server 103 refers to a device-supported-input format DB 1701 (FIG. 17) in which information indicating a relationship between a device that is usable for the registration and the input format supported by each device is saved, and specifies the input format supported by the selected device. The relay server 103 then issues only the registration code appropriate for the specified input format and also saves the issued registration code and the printing device ID into the registration code DB 1101 (FIG. 11) in association with each other (S1603). In the example illustrated in FIG. 15, the option 1503 of "smartphone" is checked in the check box 1501. For this reason, the relay server 103 refers to the device-supported-input format DB 1701 and specifies that the input formats supported by a smartphone are text input "text" and voice input "voice". The relay server 103 then issues the registration code appropriate for text input and the registration code appropriate for voice input and saves the issued registration code into the registration code DB 1101 (FIG. 11). Additionally, the relay server 103 generates printing data of the registration procedure information 1502 illustrated in FIG. 15 (S1604) and transmits a printing command of the printing data to the MFP 104 (S1605). The MFP 104 that receives the printing command performs printing of the registration procedure information 1502 based on the printing data (S1606).

As described above, in the present embodiment, after the user is allowed to select a type of the device (the information terminal) used for the registration, only the registration code of the input format appropriate for the selected device is issued. Thus, it is possible to avoid issue of a registration code inappropriate for the input format, and it is possible to make the issue processing efficient and to simplify the selection of the registration code for input.

In the present embodiment, the registration code is issued depending on the device (the information terminal) to be used; however, a type of the application used to input the registration code may be selected by the user, and an input form code appropriate for the selected application may be issued. In this case, the device-supported-input format DB illustrated in FIG. 17 may be replaced with an application-supported-input format DB, and the supported input format of each application may be saved.

Fourth Embodiment

In the above-described embodiments, text input and voice input are described as an example of the input format supported by the information terminal; however, in a case where the information terminal supports another input format, it is also possible to input a registration code by using the input format. In a fourth embodiment described below, an example where a smartphone is used as the information terminal and the registration code is inputted by using pattern code input used in a lock screen of the smartphone is described.

Figure 18A:
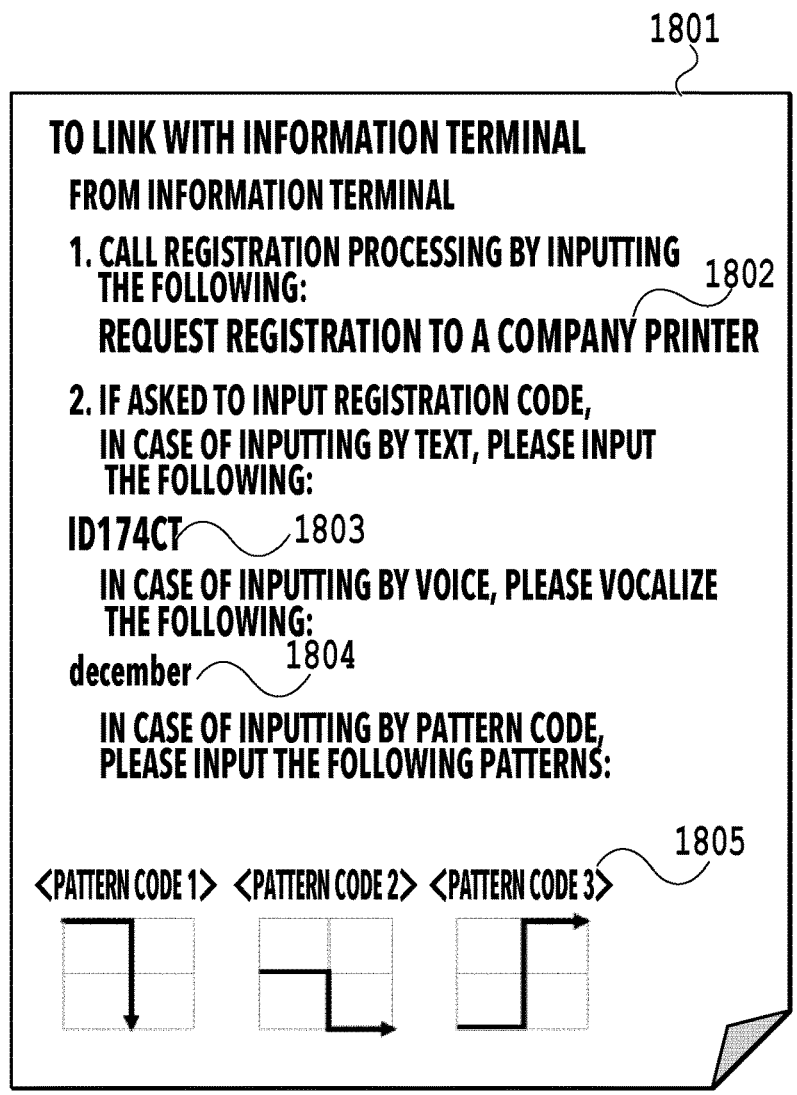
FIGS. 18A and 18B are diagrams illustrating a configuration example of registration procedure information outputted from an MFP in a fourth embodiment.

Once the registration start button 902 (FIG. 9A) displayed on the display unit 408 of the MFP 104 is pressed as with the first embodiment, in the present embodiment, the relay server 103 issues not only the registration code for text input and the registration code for voice input but also the registration code appropriate for pattern code input. Once receiving those registration codes, the MFP 104 outputs registration procedure information 1801 for the information terminal registration as illustrated in FIG. 18A as a printed product. In the registration procedure information 1801 for the information terminal registration, a registration-function-call 1802, a registration code 1803 for text input, a registration code 1804 for voice input, and a registration code 1805 for pattern code input are described.

Figure 18B:
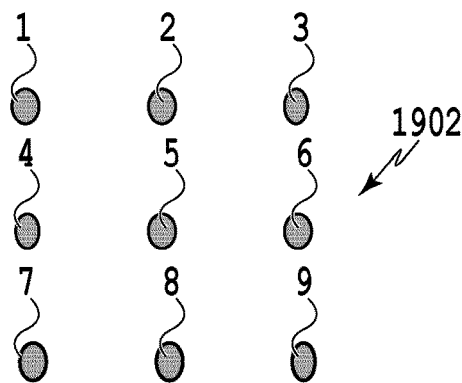

The registration code 1805 includes a pattern code 1, a pattern code 2, and a pattern code 3. As illustrated in FIG. 18B, each pattern code includes a pattern code in which multiple points (here, four or five points) within nine points arrayed vertically and horizontally are connected sequentially to each other. Different numeric values are allocated to the points illustrated in FIG. 18B, respectively. For example, numeric values of 1, 2, 3, . . . 9 are allocated sequentially from a point at the top left to a point at the bottom right. Accordingly, the pattern code 1 corresponds to a numeric value code "1258", the pattern code 2 corresponds to a numeric value code "4589", and the pattern code 3 corresponds to a numeric value code "78523", respectively. The registration code 1805 including those pattern codes is associated with a numeric value of "1258, 4589, 78523". In a case of issuing the registration code, the relay server 103 registers the above-described registration code "1258, 4589, 78523" converted into a numeric value into a registration code DB 1901 illustrated in FIG. 19 as the registration code 1805 for pattern input.

Figure 20C:
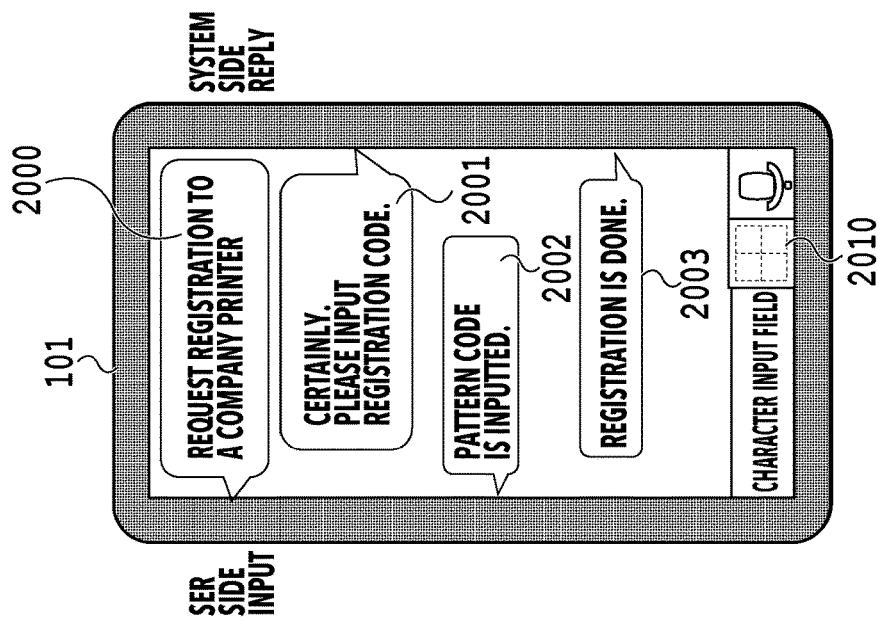
FIGS. 20A to 20C are diagrams illustrating transition of a screen in a case of inputting a pattern code according to the fourth embodiment.
Figure 20B:
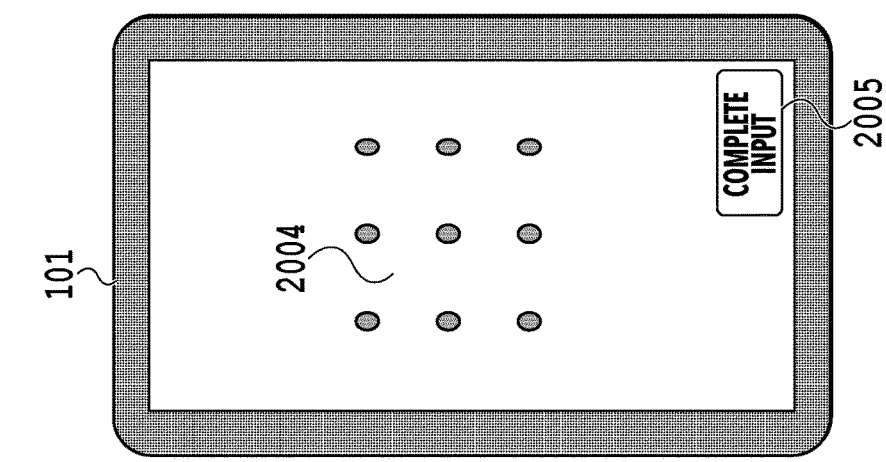
Figure 20A:
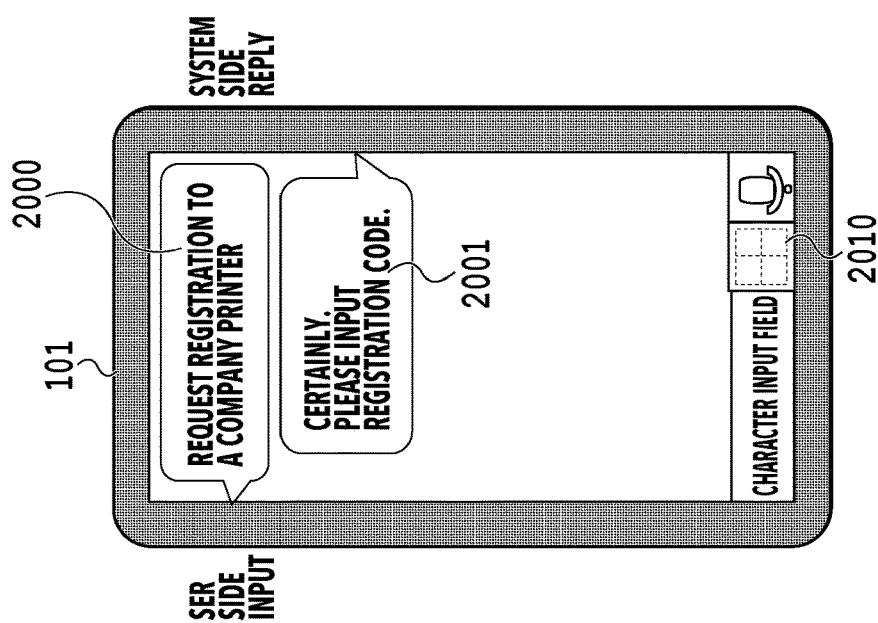

FIGS. 20A to 20B are diagrams illustrating a screen transition in a case of inputting the registration code for pattern code input into the information terminal 101 in the present embodiment. FIG. 20A illustrates a state where the user inputs the registration-function-call instruction to the information terminal 101 in accordance with the registration procedure information 1801 (FIG. 18A). In response to the input of the call instruction, an inputted content 2000 of the call instruction and a response 2001 in a sentence encouraging input of the registration code transmitted from the relay server 103 are displayed on the information terminal 101. Once the user presses a pattern code input button 2010, the information terminal 101 displays an interface screen 2004 for pattern code input illustrated in FIG. 20B.

In this process, the user traces points displayed on the interface screen 2004 with a finger in accordance with the pattern code 1, the pattern code 2, and the pattern code 3 described in the registration procedure information 1801. After tracing all the pattern codes with the finger, the user presses an input completion button 2005. Thus, the input operation of the registration code 1805 is completed. Once the input completion button 2005 is pressed, the information terminal 101 closes the interface screen 2004 for pattern code input and switches to a screen illustrated in FIG. 20C. A display 2002 indicating that the pattern code is inputted in the information terminal 101 is outputted to the screen. Additionally, if the registration code 1805 inputted from the information terminal 101 is proper, information indicating that the registration is completed is transmitted from the relay server 103, and an input completion notification 2003 is displayed on the screen of the information terminal 101.

Figure 21:
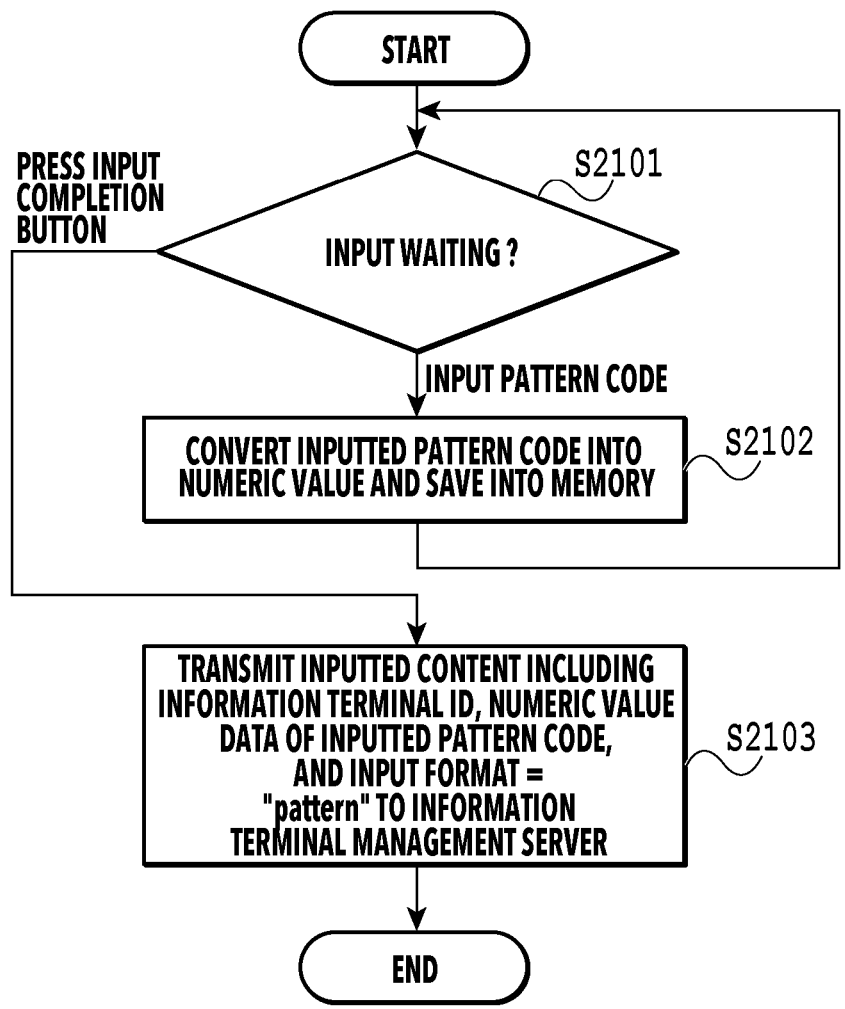
FIG. 21 is a flowchart illustrating input processing of the pattern code according to the fourth embodiment.

FIG. 21 is a flowchart illustrating input processing of the registration code in the interface screen 2004 for pattern code input. The processing performed in this case is executed by the CPU 203 of the information terminal 101. Once the user presses the pattern code input button 2010 displayed on the screen illustrated in FIG. 20A, the CPU 203 opens the interface screen 2004 for pattern code input illustrated in FIG. 20B to be set in an input waiting state (S2101). In a case where a pattern code is inputted to the interface screen 2004, the user traces the points displayed on the interface screen 2004 with a finger, and thereafter removes the finger from the interface screen 2004. Thus, the CPU 203 determines that a single pattern code is inputted and performs numerical conversion processing of the pattern code by associating each of the points with a numeric value in the order of tracing the points (S2102). Thereafter, the CPU 203 holds the pattern code converted into a numerical value into a memory (the RAM 207) and transitions to the input waiting state (S2101). Thus, input of the first pattern code is completed. Then, once the second pattern code is inputted, the CPU 203 performs the numerical conversion processing in S2102 and stores the second pattern code converted into a numerical value into the memory (S2102). The above-described processing is repeated for also the third and following pattern codes. Thus, multiple pattern codes forming the registration code are converted into numeric values and held. Thereafter, once the user presses the input completion button, in S2103, the CPU 203 transmits the inputted content including the information terminal ID, numeric value data of the inputted pattern code (the registration code), and information of "pattern" indicating the input format to the information terminal management server 102, and the processing ends.

In the above-described input processing, for example, in a case where the registration code 1805 in FIG. 18A is inputted to the information terminal 101, the user sequentially inputs the pattern code 1, the pattern code 2, and the pattern code 3. The pattern codes are sequentially converted into numeric values, respectively, by the numerical conversion processing in S2102, and the registration code converted into a numeric value of "1258, 4589, 78523" is held into the memory. The registration code converted into the numeric value is transmitted to the information terminal management server 102 by the transmission processing in S2103 with the information of "pattern" indicating the input format.

The transmission processing (S2103) in the present embodiment corresponds to processing of S1211 in FIG. 12 previously described in the first embodiment. After the transmission processing in S2103, processing, which is similar to the processing illustrated in FIG. 12 except the input format, is executed. That is, the information terminal management server 102 performs the specifying processing of the input format (S1215) based on the inputted content transmitted from the information terminal 101. In the present embodiment, since the information of "pattern" indicating the input format is transmitted in the transmission processing (S2103) in the information terminal 101, the information terminal management server 102 specifies that the input format is "pattern". A registration code falling under the command part is specified from the inputted content. Thereafter, the information terminal management server 102 transmits the information terminal ID, the command part (the registration code), and the input format to the relay server 103 (S1216). The input format in this case is "pattern". For this reason, the relay server 103 refers to the registration code DB 1901 illustrated in FIG. 19 and determines whether there is a combination that coincides with the combination of the received registration code and input format in the registration code DB 1901. If there is a combination that coincides with the combination of the received registration code and input format in the registration code DB 1901, the printing device ID associated with the combination and the information terminal ID are saved into the link management DB 601 (FIG. 6) in association with each other. Thus, the association between the information terminal 101 and the desired printing device (the MFP 104) is registered, and it is possible to link the information terminal 101 and the MFP 104.

The pattern code input used in the present embodiment is one of input formats that are easy to handle and easy to perform the input operation for the user. For this reason, according to the present embodiment where the input of the registration code can be performed by using this input format, it is possible to reduce a burden on the user in the registration processing for associating the information terminal 101 with the printing device (the MFP 104).

In the present embodiment, in a case of transmitting the registration data that is the pattern data converted into a numeric value from the information terminal 101 to the information terminal management server 102, particular information indicating pattern input (in the present embodiment, "pattern") is transmitted. Thus, the information terminal management server 102 is able to clearly differentiate and recognize the pattern input and the other input formats (text input and voice input). Therefore, it is possible to properly perform the registration processing for associating the information terminal 101 with the printing device (the MFP 104) by pattern input. That is, with the particular information as described above being transmitted with the registration code, it is possible to clearly differentiate the pattern input from the other input formats, and it is possible to prevent the registration with a registration code for pattern code input that is inputted in the other input formats. Therefore, it is possible to implement proper registration processing. As the other input formats, for example, an input format that displays a pattern, a picture, and the like corresponding to a registration code that is formed of numeric value data indicating the registration code on the information terminal 101 and that transmits the numeric value data indicating the registration code by touching the display. Also in this case, with the particular information indicating the input format being transmitted with the registration code from the information terminal to the information terminal management server 102, it is possible to allow the information terminal management server 102 to specify the input format.

Other Embodiments

In the above-described embodiments, the control system in which multiple devices including the printing device and the corresponding multiple relay servers are communicably provided in the information terminal management server and each device is controllable from the information terminal through the information terminal management server and the relay server is described; however, the present disclosure is not limited thereto. For example, the present disclosure is also applicable to a printing control system in which one or more printing devices corresponding to a single relay server is selectively controlled from a mobile terminal. In this case, it is also possible to omit the information terminal management server by allowing the relay server to have a function executed by the information terminal management server that is an intermediation function served by the information terminal management server 102 including, for example, a function of communicating with the information terminal, a function of converting the voice data into text data, and the like. That is, it is also possible to form a server system with a single server device (the relay server).

In the above-described embodiments, the printing control system in which a device having the printing function such as the MFP 104 is controlled from the information terminal 101 through the server systems 102 and 103 is described as an example. However, the present disclosure is not limited thereto. With the present disclosure, it is also possible to set a device having no printing function as the control target device. That is, even if the device has no printing function, as long as it is a device including a display unit that is capable of displaying the registration procedure information including the registration code and the like issued from the server system, the device can be set as the control target device, and it is possible to perform the registration processing for associating the control device with the information terminal.

It is also possible to implement the present disclosure by processing of supplying a system or a device with a program to implement one or more functions of the above-described embodiments through a network or a storage medium, and reading and executing the program by one or more processors in a computer in the system or the device. It is also possible to implement the present disclosure with a circuit implementing one or more functions (for example, an ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-104838 filed Jun. 24, 2021, which is hereby incorporated by reference wherein in its entirety.

What is claimed is:

1. A control system, comprising:
at least one processor and at least one memory coupled to the at least one processor and having stored thereon instructions that, when executed by the at least one processor, cooperate with the at least one processor to act as:
a control target device communicable with an information terminal; and
a server system,
the server system including an issue unit that issues a registration code having a format that is different depending on whether an input format of the information terminal is character input or voice input, in response to an issue request of a registration code and a reply unit that replies the registration code to the control target device,
the control target device including an issue request unit that generates the issue request transmitted to the server system and a presenting unit that presents the registration code replied from the reply unit to a user, wherein
in a case where the registration code presented by the control target device is inputted to the information terminal, information including the inputted registration code and an ID of the information terminal is transmitted to the server system, and
in a case where a registration code transmitted from the information terminal and an input format of the registration code coincide with the registration code issued by the issue unit and an input format of the registration code, the server system performs registration processing for associating the control target device with the information terminal specified by the ID.

2. The control system according to claim 1, wherein
the information terminal is able to input the registration code in a plurality of the input formats different from each other, and
the issue unit issues a plurality of the registration codes in accordance with each of a plurality of the input formats.

3. The control system according to claim 1, wherein
the information terminal is able to input the registration code in a plurality of the input formats different from each other,
the control target device is able to transmit selected information, in which an input format out of the plurality of the input formats that is to be used to input the registration code is selected, to the server system, and
the issue unit issues the registration code corresponding to only the input format out of the plurality of the input formats that is selected by the selected information.

4. The control system according to claim 1, wherein
the control target device is able to transmit selected information, in which a device to be used as the information terminal is selected, to the server system, and the issue unit issues the registration code corresponding to an input format of the device selected by the selected information.

5. The control system according to claim 1, wherein the server system links the information terminal and the control target device based on the registration code transmitted from the information terminal and an input format of the registration code.

6. The control system according to claim 5, wherein the server system specifies whether the input format of the registration code is character input or voice input based on the registration code transmitted from the information terminal.

7. The control system according to claim 5, wherein in a case where the registration code is inputted in another input format that is neither voice input nor character input, the information terminal transmits input format information indicating the input format of the registration code to the server system with the registration code, and
the server system specifies the input format of the registration code based on the input format information.

8. The control system according to claim 7, wherein the other input format is pattern input.

9. The control system according to claim 1, wherein the presenting unit provided in the control target device presents registration procedure information including the registration code by a display or voice.

10. The control system according to claim 1, wherein the control target device has a function of printing on a printing medium, and
the presenting unit presents registration procedure information including the registration code as a printed product that is printed on a printing medium by the printing function.

11. The control system according to claim 1, wherein the server system extracts the registration code and the ID from the information transmitted by the information terminal and performs the registration processing by using the extracted registration code and ID.

12. A server system that links an information terminal and a control target device, comprising:
at least one processor and at least one memory coupled to the at least one processor and having stored thereon instructions that, when executed by the at least one processor, cooperate with the at least one processor to act as:
a first reception unit that receives an issue request of a registration code transmitted from the control target device;
an issue unit that issues a registration code having a format that is different depending on whether an input format of the information terminal is character input or voice input, in response to the issue request;
a reply unit that replies the registration code issued by the issue unit to the control target device;
a second reception unit that receives the registration code inputted to the information terminal and an ID of the information terminal from the information terminal; and
a control unit that performs registration processing for associating the control target device with the information terminal specified by the ID in a case where the registration code received by the second reception unit and an input format of the registration code coincide with the registration code issued by the issue unit and an input format of the registration code.

13. A control method for linking an information terminal and a control target device, comprising the steps of:
transmitting an issue request of a registration code generated by the control target device to a server system;
issuing a registration code having a format that is different depending on whether an input format of the information terminal is character input or voice input, by the server system that receives the issue request and replying the registration code to the control target device;
presenting the registration code replied from the server system to a user by the control target device;
inputting the registration code presented by the control target device to the information terminal;
transmitting the registration code inputted to the information terminal from the information terminal to the server system with an ID of the information terminal; and
performing registration processing for associating the control target device with the information terminal specified by the ID by the server system in a case where the registration code transmitted from the information terminal and an input format of the registration code coincide with the registration code issued by the server system and an input format of the registration code.

14. A non-transitory computer readable storage medium storing a program for causing a computer included in a server system that links an information terminal and a control target device to execute a process, the process comprising:
issuing a registration code having a format that is different depending on whether an input format of the information terminal is character input or voice input, in response to an issue request of a registration code transmitted from the control target device; and
receiving the registration code inputted to the information terminal and an ID of the information terminal from the information terminal and, in a case where the received registration code and an input format of the registration code coincide with the registration code issued by the issue unit and an input format of the registration code, performing registration for associating the control target device with the information terminal specified by the ID.

* * * * *